United States Patent
Gray et al.

(10) Patent No.: US 11,692,447 B1
(45) Date of Patent: Jul. 4, 2023

(54) SURFACE PROFILES FOR TIP RAILS OF TURBINE BLADE TIP SHROUD

(71) Applicant: General Electric Company, Schenectady, NY (US)

(72) Inventors: Brian Stephen Gray, Greenville, SC (US); Richard Ryan Pilson, Greer, SC (US); William Scott Zemitis, Simpsonville, SC (US); Dustin James Hall, Simpsonville, SC (US); Derek Kanoa Tan, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/860,504

(22) Filed: Jul. 8, 2022

(51) Int. Cl.
*F01D 5/22* (2006.01)
*F01D 5/14* (2006.01)

(52) U.S. Cl.
CPC .............. *F01D 5/225* (2013.01); *F01D 5/141* (2013.01); *F01D 5/143* (2013.01); *F05D 2220/30* (2013.01); *F05D 2220/3212* (2013.01); *F05D 2240/30* (2013.01); *F05D 2250/74* (2013.01)

(58) Field of Classification Search
CPC ........ F01D 5/225; F01D 11/12; F01D 11/122; F01D 11/125; F01D 11/127; F01D 5/141; F01D 5/142; F01D 5/143; F05D 2220/3213; F05D 2220/321; F05D 2220/3212; F05D 2220/3215; F05D 2250/74

See application file for complete search history.

(56) References Cited

U.S. PATENT DOCUMENTS

| | | | |
|---|---|---|---|
| 8,057,186 B2 | 11/2011 | Brittingham | |
| 8,192,166 B2 | 6/2012 | Beeck et al. | |
| 11,236,620 B1* | 2/2022 | Zemitis | F01D 5/20 |
| 11,371,363 B1* | 6/2022 | Gutta | F01D 5/143 |
| 2009/0263248 A1* | 10/2009 | Brittingham | F01D 5/225 |
| | | | 416/179 |
| 2018/0230821 A1* | 8/2018 | Zemitis | F01D 5/225 |
| 2022/0307376 A1* | 9/2022 | Tan | F01D 5/225 |
| 2022/0325629 A1* | 10/2022 | Tan | F01D 5/147 |
| 2022/0341332 A1* | 10/2022 | Jayana | F01D 5/005 |

\* cited by examiner

*Primary Examiner* — Christopher Verdier
(74) *Attorney, Agent, or Firm* — James Pemrick; Charlotte Wilson; Hoffman Warnick LLC

(57) ABSTRACT

A tip shroud may include a platform to couple to an airfoil having a pressure side and a suction side. A front tip rail and a rear tip rail extend radially from the platform with each including a downstream side, an upstream side, and an origin(s). Each of the downstream side and the upstream side of the rear tip rail and the downstream side of the front tip rail has a shape having a nominal profile substantially in accordance with Cartesian coordinate values of X, Y, Z set forth in a respective table and originating at a selected origin. The Cartesian coordinate values are non-dimensional values of from 0% to 100% convertible to distances by multiplying the X, Y, Z values by a minimum rear tip rail X-wise extent expressed in units of distance. The X, Y, Z values are connected by lines to define each respective surface profile.

20 Claims, 9 Drawing Sheets

SURFACE PROFILES FOR TIP RAILS OF TURBINE BLADE TIP SHROUD

FIELD OF THE DISCLOSURE

The subject matter disclosed herein relates to turbomachines. More particularly, the subject matter disclosed herein relates to surface profiles for tip rails of a turbine blade tip shroud.

BACKGROUND OF THE DISCLOSURE

Some jet aircraft and simple or combined cycle power plant systems employ turbines, or so-called turbomachines, in their configuration and operation. Some of these turbines employ airfoils (e.g., turbine nozzles, blades, airfoils, etc.), which during operation are exposed to fluid flows. These airfoils are configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. During operation, tip shrouds on the radially outer end of the airfoils interact with stationary components to direct hot gases towards the airfoils. Due to this interaction and conversion, the aerodynamic characteristics of these tip shrouds and any tip rails thereon may result in losses in system and turbine operation, performance, thrust, efficiency, reliability, and power.

BRIEF DESCRIPTION OF THE DISCLOSURE

All aspects, examples and features mentioned below can be combined in any technically possible way.

An aspect of the disclosure provide a turbine blade tip shroud, comprising: a platform configured to couple to an airfoil at a radial outer end of the airfoil, the airfoil having a pressure side and a suction side opposing the pressure side; a rear tip rail extending radially from the platform, the rear tip rail having a downstream side, an upstream side opposing the downstream side, and a first origin on the pressure side of the airfoil and at a radial outermost point farthest from the pressure side of the airfoil; and a front tip rail extending radially from the platform at a location axially forward of the rear tip rail, the front tip rail having a downstream side, an upstream side opposing the downstream side, and a second origin on the pressure side of the airfoil and at a radial outermost point farthest from the pressure side of the airfoil, and wherein the downstream side of the rear tip rail has a shape having a nominal profile substantially in accordance with at least part of Cartesian coordinate values of X, Y, and Z set forth in TABLE I and originating at the first origin, wherein the Cartesian coordinate values are non-dimensional values of from 0% to 100% convertible to distances by multiplying the X, Y, and Z values by a minimum rear tip rail X-wise extent expressed in units of distance, and wherein X, Y, and Z values are connected by lines to define a rear tip rail, first downstream side surface profile.

Another aspect of the disclosure includes any of the preceding aspects, and the turbine blade includes a second stage blade.

Another aspect of the disclosure includes any of the preceding aspects, and the rear tip rail further includes a third origin on the suction side of the airfoil and at a radial outermost point farthest from the suction side of the airfoil, and wherein the downstream side of the rear tip rail has a shape having a nominal profile substantially in accordance with Cartesian coordinate values of X, Y, Z and thickness values set forth in TABLE II and originating at the third origin, wherein the Cartesian coordinate values are non-dimensional values of from 0% to 100% convertible to distances by multiplying the values by the minimum rear tip rail X-wise extent, and wherein X and Y values are joined smoothly to define a rear tip rail, second downstream side surface profile.

Another aspect of the disclosure includes any of the preceding aspects, and the upstream side of the rear tip rail has a shape having a nominal profile substantially in accordance with Cartesian coordinate values of X, Y, and Z set forth in TABLE III and originating at the first origin, wherein the Cartesian coordinate values are non-dimensional values of from 0% to 100% convertible to distances by multiplying the X, Y, and Z values by the minimum rear tip rail X-wise extent expressed in units of distance, and wherein X, Y, and Z values are connected by lines to define a rear tip rail, upstream side surface profile.

Another aspect of the disclosure includes any of the preceding aspects, and the downstream side of the front tip rail has a shape having a nominal profile substantially in accordance with Cartesian coordinate values of X, Y, Z set forth in TABLE IV and originating at the second origin, wherein the Cartesian coordinate values are non-dimensional values of from 0% to 100% convertible to distances by multiplying the X, Y, and Z values by the minimum rear tip rail X-wise extent, and wherein X, Y, and Z values are joined smoothly with one another to define a front tip rail, downstream side surface profile.

An aspect of the disclosure includes a turbine blade tip shroud, comprising: a platform configured to couple to an airfoil at a radial outer end of the airfoil, the airfoil having a pressure side and a suction side opposing the pressure side; a rear tip rail extending radially from the platform, the rear tip rail having a downstream side, an upstream side opposing the downstream side and a first origin on the pressure side of the airfoil and at a radial outermost point farthest from the pressure side of the airfoil; and a front tip rail extending radially from the platform at a location axially forward of the rear tip rail, the front tip rail having a downstream side, an upstream side opposing the downstream side and a second origin on the pressure side of the airfoil and at a radial outermost point farthest from the pressure side of the airfoil, and wherein the rear tip rail further includes a third origin on the suction side of the airfoil and at a radial outermost point farthest from the suction side of the airfoil, and wherein the downstream side of the rear tip rail has a shape having a nominal profile substantially in accordance with Cartesian coordinate values of X, Y, Z and thickness values set forth in TABLE II and originating at the third origin, wherein the Cartesian coordinate values are non-dimensional values of from 0% to 100% convertible to distances by multiplying the values by the minimum rear tip rail X-wise extent, and wherein X and Y values are joined smoothly to define a rear tip rail, first downstream side surface profile.

Another aspect of the disclosure includes any of the preceding aspects, and the turbine blade includes a second stage blade.

Another aspect of the disclosure includes any of the preceding aspects, and the upstream side of the rear tip rail has a shape having a nominal profile substantially in accordance with Cartesian coordinate values of X, Y, and Z set forth in TABLE III and originating at the first origin, wherein the Cartesian coordinate values are non-dimensional values of from 0% to 100% convertible to distances by multiplying the X, Y, and Z values by the minimum rear tip rail X-wise extent expressed in units of distance, and wherein X, Y, and Z values are connected by lines to define a rear tip rail, upstream side surface profile.

Another aspect of the disclosure includes any of the preceding aspects, and the downstream side of the rear tip rail has a shape having a nominal profile substantially in accordance with Cartesian coordinate values of X, Y, and Z set forth in TABLE I and originating at the first origin, wherein the Cartesian coordinate values are non-dimensional values of from 0% to 100% convertible to distances by multiplying the X, Y, and Z values by a minimum rear tip rail X-wise extent expressed in units of distance, and wherein X, Y, and Z values are connected by lines to define a rear tip rail, second downstream side surface profile.

Another aspect of the disclosure includes any of the preceding aspects, and the downstream side of the front tip rail has a shape having a nominal profile substantially in accordance with Cartesian coordinate values of X, Y, Z set forth in TABLE IV and originating at the second origin, wherein the Cartesian coordinate values are non-dimensional values of from 0% to 100% convertible to distances by multiplying the X, Y, and Z values by the minimum rear tip rail X-wise extent, and wherein X, Y, and Z values are joined smoothly with one another to define a front tip rail, downstream side surface profile.

Another aspect of the disclosure includes a turbine blade tip shroud, comprising: a platform configured to couple to an airfoil at a radial outer end of the airfoil, the airfoil having a pressure side and a suction side opposing the pressure side; a rear tip rail extending radially from the platform, the rear tip rail having a downstream side, an upstream side opposing the downstream side and a first origin on the pressure side of the airfoil and at a radial outermost point farthest from the pressure side of the airfoil; and a front tip rail extending radially from the platform at a location axially forward of the rear tip rail, the front tip rail having a downstream side, an upstream side opposing the downstream side and a second origin on the pressure side of the airfoil and at a radial outermost point farthest from the pressure side of the airfoil, and wherein the upstream side of the rear tip rail has a shape having a nominal profile substantially in accordance with Cartesian coordinate values of X, Y, and Z set forth in TABLE III and originating at the first origin, wherein the Cartesian coordinate values are non-dimensional values of from 0% to 100% convertible to distances by multiplying the X, Y, and Z values by the minimum rear tip rail X-wise extent expressed in units of distance, and wherein X, Y, and Z values are connected by lines to define a rear tip rail, upstream side surface profile.

Another aspect of the disclosure includes any of the preceding aspects, and the turbine blade includes a second stage blade.

Another aspect of the disclosure includes any of the preceding aspects, and the downstream side of the front tip rail has a shape having a nominal profile substantially in accordance with Cartesian coordinate values of X, Y, Z set forth in TABLE IV and originating at the second origin, wherein the Cartesian coordinate values are non-dimensional values of from 0% to 100% convertible to distances by multiplying the X, Y, and Z values by the minimum rear tip rail X-wise extent, and wherein X, Y, and Z values are joined smoothly with one another to define a front tip rail, downstream side surface profile.

Another aspect of the disclosure includes any of the preceding aspects, and the downstream side of the rear tip rail has a shape having a nominal profile substantially in accordance with Cartesian coordinate values of X, Y, and Z set forth in TABLE I and originating at the first origin, wherein the Cartesian coordinate values are non-dimensional values of from 0% to 100% convertible to distances by multiplying the X, Y, and Z values by a minimum rear tip rail X-wise extent expressed in units of distance, and wherein X, Y, and Z values are connected by lines to define a rear tip rail, first downstream side surface profile.

Another aspect of the disclosure includes any of the preceding aspects, and the rear tip rail further includes a third origin on the suction side of the airfoil and at a radial outermost point farthest from the suction side of the airfoil, and wherein the downstream side of the rear tip rail has a shape having a nominal profile substantially in accordance with Cartesian coordinate values of X, Y, Z and thickness values set forth in TABLE II and originating at the third origin, wherein the Cartesian coordinate values are non-dimensional values of from 0% to 100% convertible to distances by multiplying the values by the minimum rear tip rail X-wise extent, and wherein X and Y values are joined smoothly to define a rear tip rail, second downstream side surface profile.

An aspect of the disclosure includes a turbine blade tip shroud, comprising: a platform configured to couple to an airfoil at a radial outer end of the airfoil, the airfoil having a pressure side and a suction side opposing the pressure side; a rear tip rail extending radially from the platform, the rear tip rail having a downstream side, an upstream side opposing the downstream side and a first origin on the pressure side of the airfoil and at a radial outermost point farthest from the pressure side of the airfoil; and a front tip rail extending radially from the platform at a location axially forward of the rear tip rail, the front tip rail having a downstream side, an upstream side opposing the downstream side and a second origin on the pressure side of the airfoil and at a radial outermost point farthest from the pressure side of the airfoil, and wherein the downstream side of the front tip rail has a shape having a nominal profile substantially in accordance with Cartesian coordinate values of X, Y, Z set forth in TABLE IV and originating at the second origin, wherein the Cartesian coordinate values are non-dimensional values of from 0% to 100% convertible to distances by multiplying the X, Y, and Z values by the minimum rear tip rail X-wise extent, and wherein X, Y, and Z values are joined smoothly with one another to define a front tip rail, downstream side surface profile.

Another aspect of the disclosure includes any of the preceding aspects, and the turbine blade includes a second stage blade.

Another aspect of the disclosure includes any of the preceding aspects, and the downstream side of the rear tip rail has a shape having a nominal profile substantially in accordance with Cartesian coordinate values of X, Y, and Z set forth in TABLE I and originating at the first origin, wherein the Cartesian coordinate values are non-dimensional values of from 0% to 100% convertible to distances by multiplying the X, Y, and Z values by a minimum rear tip rail X-wise extent expressed in units of distance, and wherein X, Y, and Z values are connected by lines to define a rear tip rail, first downstream side surface profile.

Another aspect of the disclosure includes any of the preceding aspects, and the rear tip rail further includes a third origin on the suction side of the airfoil and at a radial outermost point farthest from the suction side of the airfoil, and wherein the downstream side of the rear tip rail has a shape having a nominal profile substantially in accordance with Cartesian coordinate values of X, Y, Z and thickness values set forth in TABLE II and originating at the third origin, wherein the Cartesian coordinate values are non-dimensional values of from 0% to 100% convertible to distances by multiplying the values by the minimum rear tip rail X-wise extent, and wherein X and Y values are joined smoothly to define a rear tip rail, second downstream side surface profile.

Another aspect of the disclosure includes any of the preceding aspects, and the upstream side of the rear tip rail has a shape having a nominal profile substantially in accordance with Cartesian coordinate values of X, Y, and Z set forth in TABLE III and originating at the first origin, wherein the Cartesian coordinate values are non-dimensional values of from 0% to 100% convertible to distances by multiplying the X, Y, and Z values by the minimum rear tip rail X-wise extent expressed in units of distance, and wherein X, Y, and Z values are connected by lines to define a rear tip rail, upstream side surface profile.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
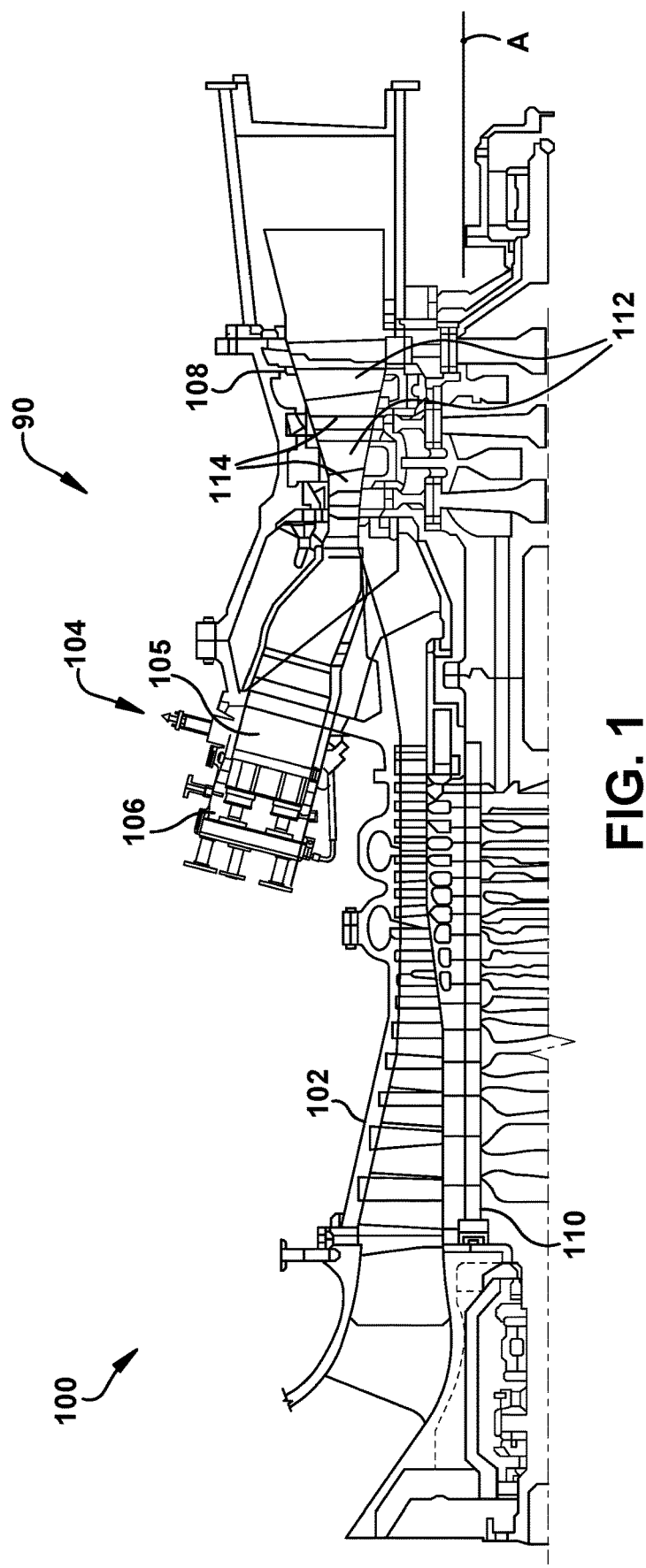
FIG. 1 shows a schematic cross-sectional side view of an illustrative turbomachine.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION OF THE DISCLOSURE

As an initial matter, in order to clearly describe the current technology, it will become necessary to select certain terminology when referring to and describing relevant machine components within a turbomachine. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. The terms "front," "forward," or "fore," without any further specificity, refer to directions closer to the front or intake end of a turbine of the engine, and "rear," "aftward," or "aft," without any further specificity, refer to directions closer to the rear or exhaust end of a turbine of the engine. "Downstream" and "upstream" are terms that indicate a direction relative to the flow of a fluid, such as the working fluid through the turbine from front to rear. The term "downstream" corresponds to the direction of flow or facing in the direction of flow of the fluid, and the term "upstream" refers to the direction opposite to the flow or facing in an opposite direction of flow of the fluid.

It is often required to describe parts that are disposed at different radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis A, e.g., rotor shaft 110. Finally, the term "circumferential" refers to movement or position around an axis. It will be appreciated that such terms may be applied in relation to the center axis of the turbomachine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described feature may or may not be present and that the description includes instances where the feature is present and instances where it is not.

Where an element or layer is referred to as being "on," "engaged to," "connected to," or "coupled to" another element or layer, it may be directly on, engaged to, connected to, or coupled to the other element or layer, or intervening elements or layers may be present. In contrast, when an element is referred to as being "directly on," "directly engaged to," "directly connected to," or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Various aspects of the disclosure are directed toward surface profiles of tip rails of a tip shroud of a turbine rotor blade that rotates (hereinafter, "blade" or "turbine blade"). Embodiments of the tip shroud include a platform configured to couple to an airfoil at a radial outer end of the airfoil. The airfoil has a pressure side and a suction side opposing the pressure side. The tip shroud includes a rear tip rail extending radially from the platform. The rear tip rail has a downstream side and an upstream side opposing the downstream side. The rear tip rail also may have an origin on the pressure side of the airfoil and at a radial outermost point farthest from the pressure side of the airfoil, and/or may have an origin on the suction side of the airfoil and at a radial outermost point farthest from the suction side of the airfoil. The tip shroud also has a front tip rail extending radially from the platform at a location axially forward of the rear tip rail. The front tip rail has a downstream side and an upstream side opposing the downstream side. The front tip rail may also have another origin on the pressure side of the airfoil and at a radial outermost point farthest from the pressure side of the airfoil.

Surface profiles on the downstream side and the upstream side of the rear tip rail and/or on the downstream side of the front tip rail have shapes having a nominal profile substantially in accordance with Cartesian coordinate values of X, Y, and Z set forth in a respective table and originating at a selected origin. The Cartesian coordinate values are non-dimensional values of from 0% to 100% convertible to distances by multiplying the X, Y, and Z values by a minimum rear tip rail X-wise extent expressed in units of distance. That is, the coordinate values in the tables are percentages of the minimum rear tip rail X-wise extent, so the multiplication of the actual, desired minimum rear tip rail X-wise extent renders the actual coordinates of the surface profile for a tip shroud having that actual, desired minimum rear tip rail X-wise extent. Minimum rear tip rail X-wise extent 272 (FIG. 4A) of rear tip rail 224 is indicated at a particular location but can be anywhere along rear tip rail 224. In any event, the X, Y, Z data points may be joined smoothly with one another (with lines and/or arcs) to form a surface profile for the tip rails using any now known or later developed curve fitting technique generating a curved surface appropriate for a tip shroud. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

Referring to the drawings, FIG. 1 is a schematic view of an illustrative turbomachine 90 in the form of a combustion turbine or gas turbine (GT) system 100 (hereinafter "GT system 100"). GT system 100 includes a compressor section 102 and a combustor 104. Combustor 104 includes a combustion region 105 and a head end assembly 106 including one or more fuel nozzles. GT system 100 also includes a turbine section 108 and a common rotor compressor/turbine shaft 110 (hereinafter referred to as "rotor shaft 110").

In one non-limiting embodiment, GT system 100 may be a 9FB engine, commercially available from General Electric Company, Greenville, S.C. The present disclosure is not limited to any one particular GT system and may be implemented in connection with other engines including, for example, other FB, HA, F, B, LM, GT, TM and E-class engine models of General Electric Company, and engine models of other companies. Further, the teachings of the disclosure are not necessarily applicable to only a GT system and may be applied to other types of turbomachines, e.g., steam turbines, jet engines, compressors, etc.

Figure 2:
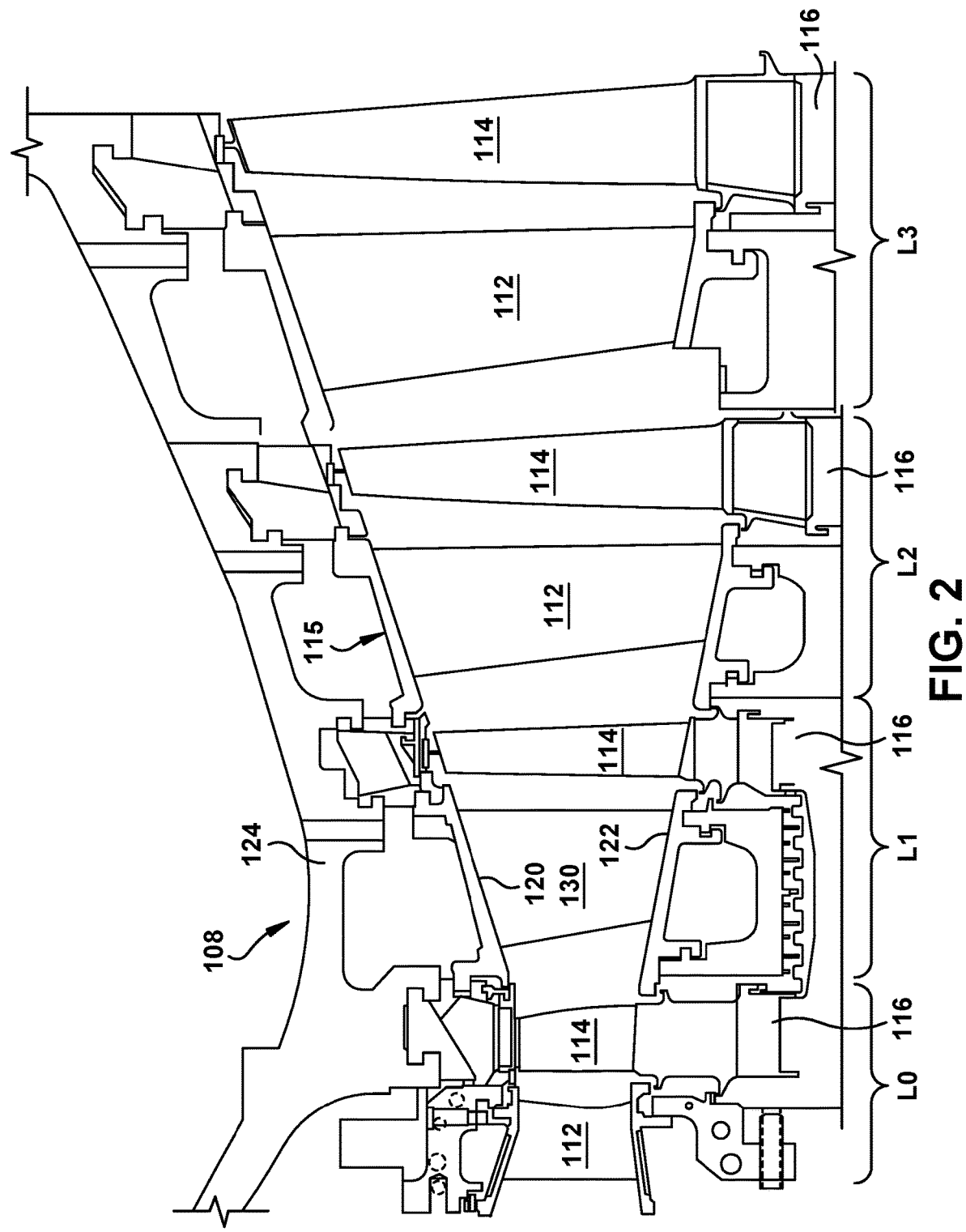
FIG. 2 shows a cross-sectional view of an illustrative turbine section with four stages that may be used with the turbomachine of FIG. 1.

FIG. 2 shows a cross-section side view of an illustrative portion of turbine section 108 with four stages L0-L3 that may be used with GT system 100 of FIG. 1. The four stages are referred to as L0, L1, L2, and L3. Stage L0 is the first stage and is the smallest (in a radial direction) of the four stages. Stage L1 is the second stage and is the next stage in an axial direction. Stage L2 is the third stage and is the next stage in an axial direction. Stage L3 is the fourth, last stage and is the largest (in a radial direction). It is to be understood that four stages are shown as one non-limiting example only, and each turbine may have more or less than four stages.

A set of stationary vanes or nozzles 112 cooperate with a set of rotating blades 114 to form each stage L0-L3 of turbine 108 and to define a portion of a flow path through turbine 108. Rotating blades 114 in each set are coupled to a respective rotor wheel 116 that couples them circumferentially to rotor shaft 110. That is, a plurality of rotating blades 114 are mechanically coupled in a circumferentially spaced manner to each rotor wheel 116. A static blade section 115 includes stationary nozzles 112 circumferentially spaced around rotor shaft 110. Each nozzle 112 may include at least one endwall (or platform) 120, 122 connected with airfoil 130. In the example shown, nozzle 112 includes a radially outer endwall 120 and a radially inner endwall 122. Radially outer endwall 120 couples nozzle 112 to a casing 124 of turbine section 108.

In operation, air flows through compressor 102, and compressed air is supplied to combustor 104. Specifically, the compressed air is supplied to fuel nozzle(s) in head end assembly 106 that is integral to combustor 104. Fuel nozzle(s) in head end assembly 106 are in flow communication with combustion region 105. Fuel nozzle(s) in head end assembly 106 are also in flow communication with a fuel source (not shown in FIG. 1) and channel fuel and air to combustion region 105. Combustor 104 ignites and combusts fuel. Combustor 104 is in flow communication with turbine section 108 within which gas stream thermal energy is converted to mechanical rotational energy. Turbine section 108 is rotatably coupled to and drives rotor shaft 110. Compressor 102 may also be rotatably coupled to rotor shaft 110. In the illustrative embodiment, there are multiple combustors 104 and head end assemblies 106. In the following discussion, unless otherwise indicated, only one of each component will be discussed. At least one end of rotating rotor shaft 110 may extend axially away from GT system 100 (e.g., from turbine section 108) and may be attached to a load or machinery (not shown), such as, but not limited to, a generator, a load compressor, and/or another turbine.

Figure 3:
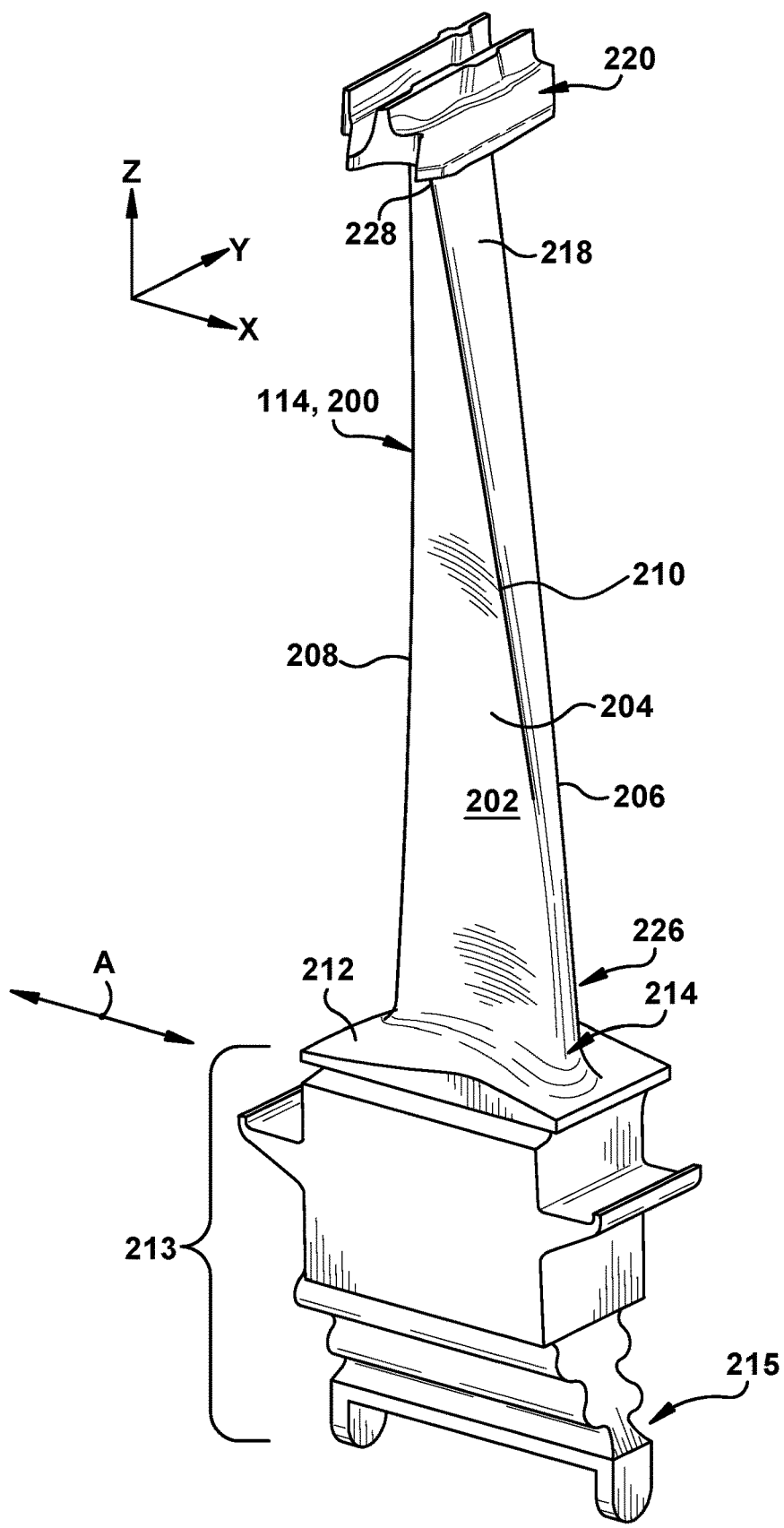
FIG. 3 shows a perspective view of an illustrative turbine blade including a tip shroud on a radial outer end of an airfoil, according to various embodiments of the disclosure.

FIG. 3 shows a perspective view of an illustrative turbine rotor blade 114 in detail as a blade 200. For purposes of description, a legend may be provided in the drawings in which the X-axis extends generally axially (i.e., along axis A of rotor shaft 110 (FIG. 1), the Y-axis extends generally perpendicular to axis A of rotor shaft 110 (FIG. 1) (indicating a circumferential plane), and the Z-axis extends radially, relative to an axis A of rotor shaft 110 (FIG. 1). The arrowheads of the legends show the direction of positive coordinate values.

Blade 200 is a rotatable (dynamic) blade, which is part of the set of turbine rotor blades 114 circumferentially dispersed about rotor shaft 110 (FIG. 1) in a stage of a turbine (e.g., one of stages L0-L3 of turbine section 108). That is, during operation of a turbine, as a working fluid (e.g., gas or steam) is directed across the blade's airfoil, blade 200 will initiate rotation of a rotor shaft (e.g., rotor shaft 110) and rotate about axis A defined by rotor shaft 110. It is understood that blade 200 is configured to couple (mechanically couple via fasteners, welds, slot/grooves, etc.) with a plurality of similar or distinct blades (e.g., blades 200 or other blades) to form a set of blades in a stage of the turbine section.

Referring to FIG. 2, in various non-limiting embodiments, blade 200 can function as a first stage (L0) blade, a second stage (L1) blade, a third stage (L2) blade, or a fourth stage (L3) blade. In particular embodiments, tip shroud 220 may be part of blade 200 that is a second stage (L1) blade. In various embodiments, turbine section 108 can include a set of blades 200 in only the first stage (L0) of turbine 108, or in only second stage (L3), or in only third stage (L2), or in only fourth stage (L3) of turbine 108.

Returning to FIG. 3, blade 200 can include an airfoil 202 having a pressure side 204 and a suction side 206 opposing pressure side 204. Blade 200 can also include a leading edge 208 spanning between pressure side 204 and suction side 206, and a trailing edge 210 opposing leading edge 208 and spanning between pressure side 204 and suction side 206. As noted, pressure side 204 of airfoil 202 generally faces upstream, and suction side 206 generally faces downstream.

As shown, airfoil 202 of blade 200 extends from a root end 212 to a radial outer end 218. More particularly, blade 200 includes airfoil 202 coupled to an endwall 212 at root end 213 and coupled to a turbine blade tip shroud 220 (hereinafter "tip shroud 220") on a tip end or radial outer end 218 thereof. Root end 213 is illustrated as including a dovetail 215 in FIG. 3, but root end 213 can have any suitable configuration to connect to rotor shaft 110. Endwall 212 can connect with airfoil 202 along pressure side 204, suction side 206, leading edge 208, and trailing edge 210. In various embodiments, blade 200 includes a fillet 214 proximate to a radially inner end 226 of airfoil 202, such that fillet 214 connects airfoil 202 and endwall 212. Fillet 214 can include a weld or braze fillet, which may be formed via conventional MIG welding, TIG welding, brazing, etc. Fillet 214 can include such forms as integral to the investment casting process or definition. Root end 212 is configured to fit into a mating slot (e.g., dovetail slot) in the turbine rotor shaft (e.g., rotor shaft 110) and to mate with adjacent components of other blades 200. Root end 212 is intended to be located radially inboard of airfoil 202 and be formed in any complementary configuration to the rotor shaft.

Tip shroud 220 connects to airfoil 202 along pressure side 204, suction side 206, leading edge 208, and trailing edge 210. In various embodiments, blade 200 includes a fillet 228 proximate to radially outer end 218 of airfoil 202, such that fillet 228 connects airfoil 202 and tip shroud 220. Fillet 228 can include a weld or braze fillet, which may be formed via conventional MIG welding, TIG welding, brazing, etc. Fillet 228 can include such forms as integral to the investment casting process or definition. In certain embodiments, fillets 214 and/or fillet 228 can be shaped to enhance aerodynamic efficiencies.

Figure 4A:
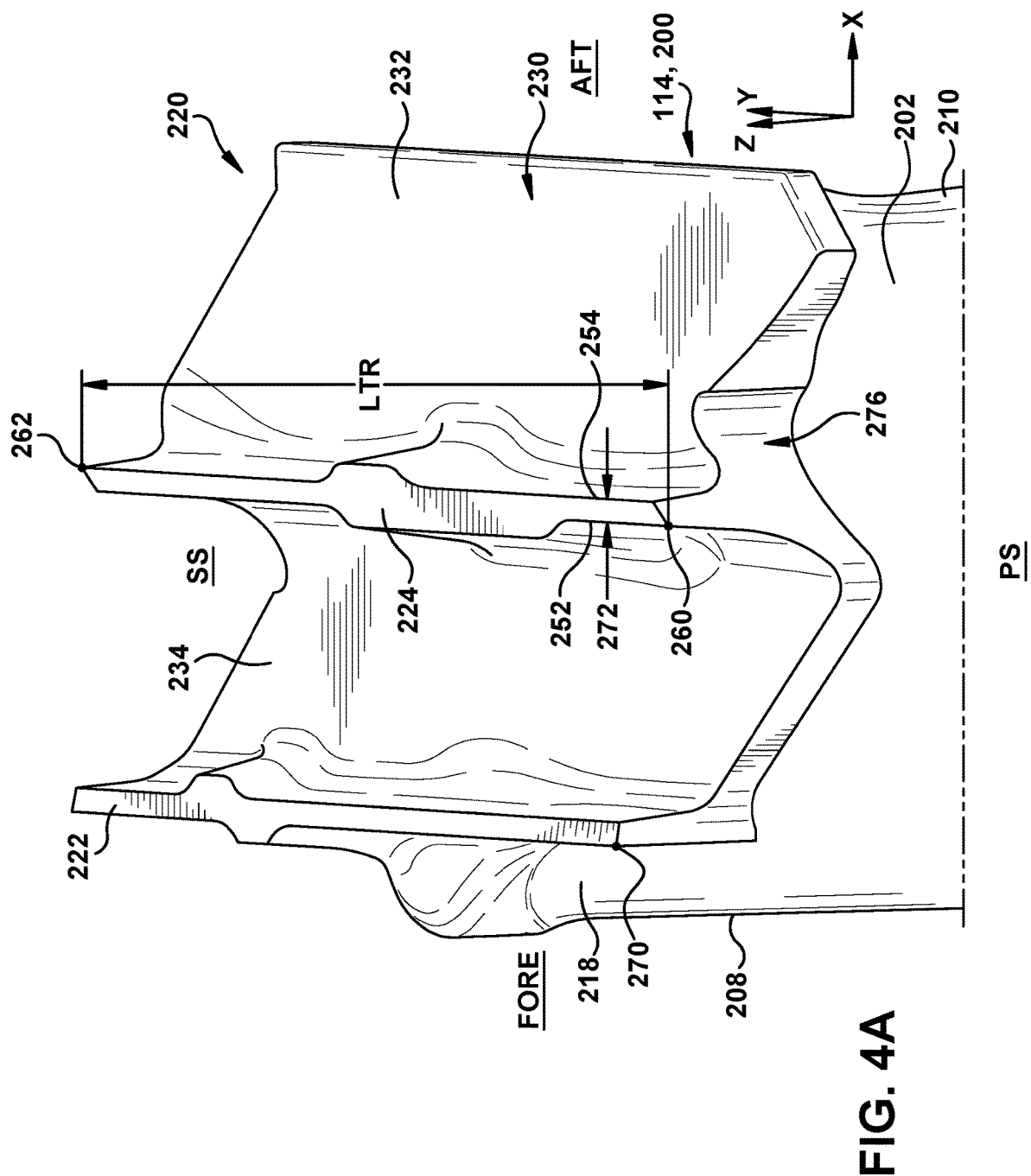
FIG. 4A shows a side perspective view of a tip shroud including a front tip rail and a rear tip rail, according to various embodiments of the disclosure.
Figure 4B:
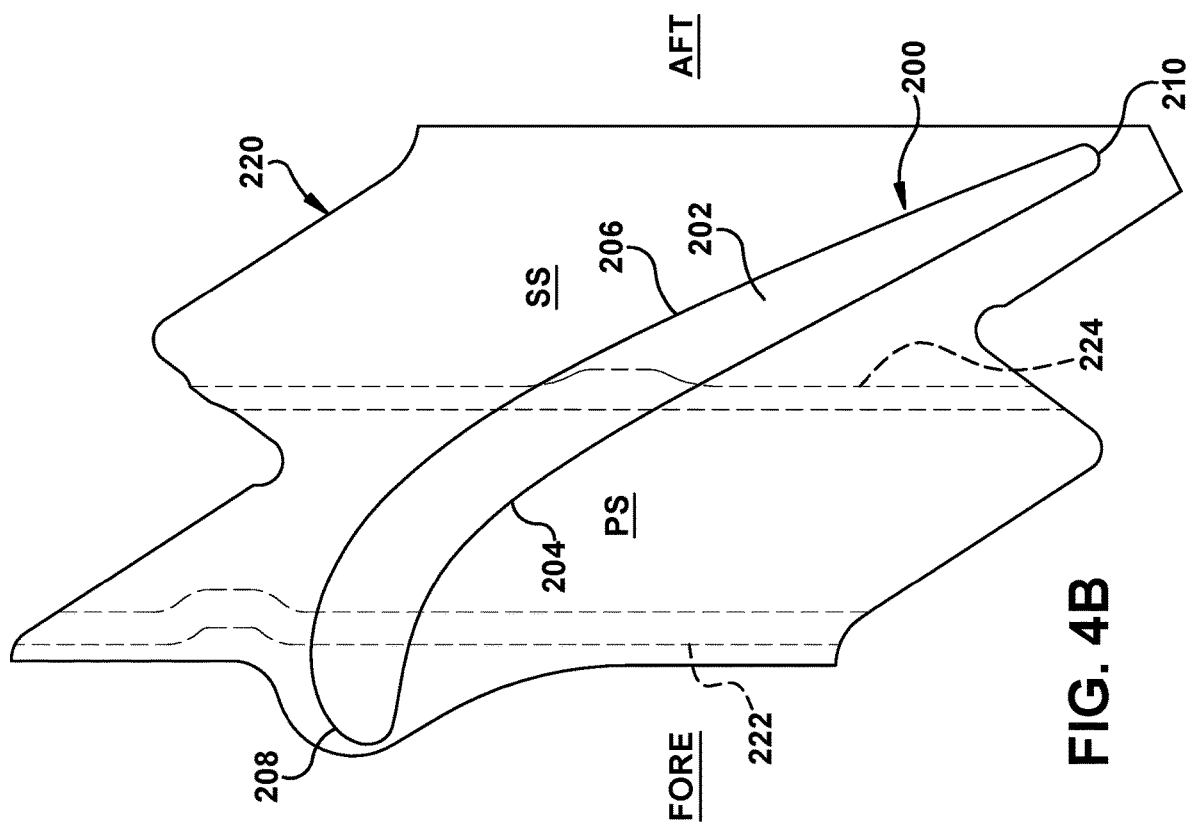
FIG. 4B shows a schematic top-down view of a tip shroud including a front tip rail and a rear tip rail, according to various embodiments of the disclosure.
Figure 5:
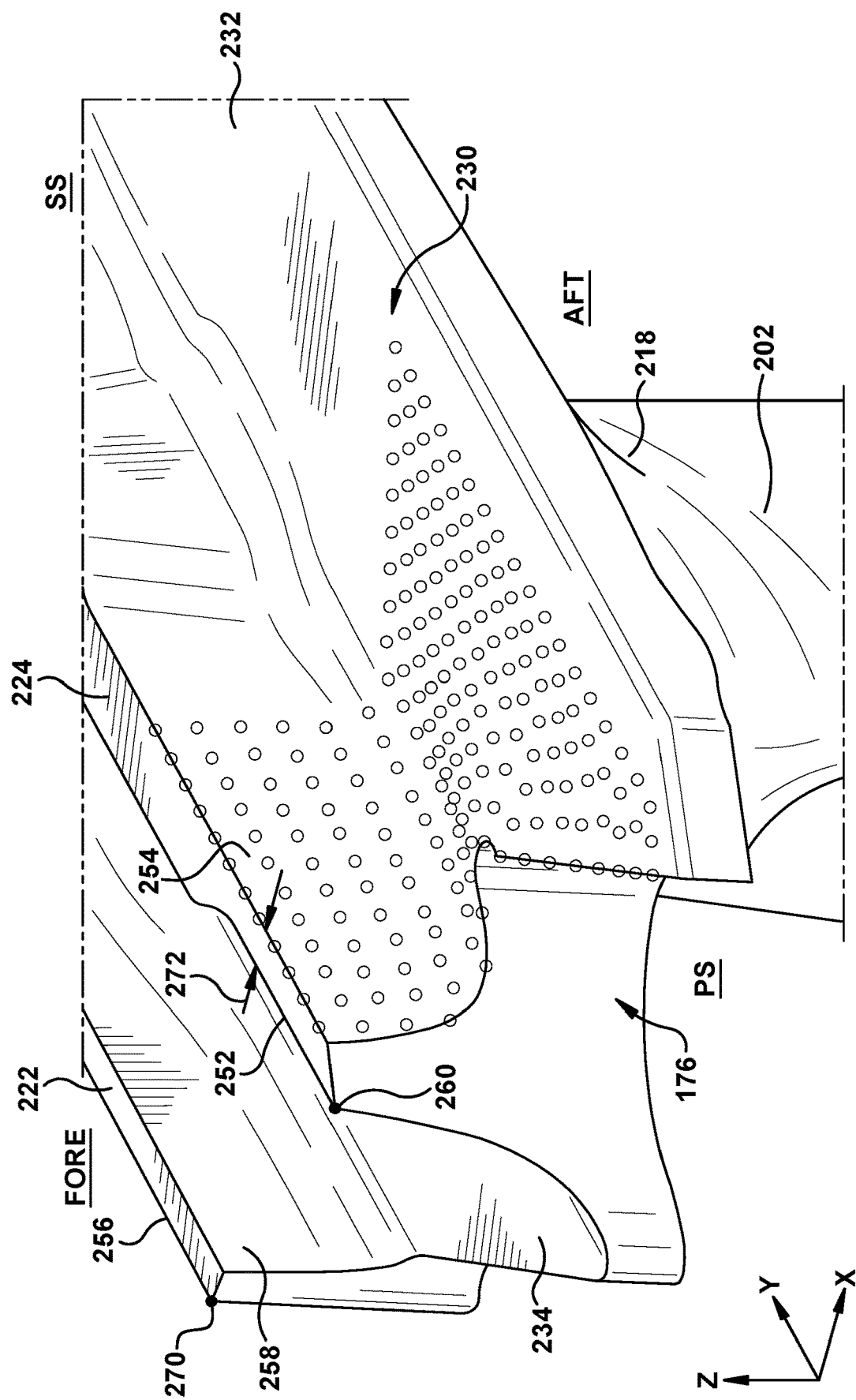
FIG. 5 shows a rear perspective view of a tip shroud including points of a rear tip rail, first downstream side surface profile, according to embodiments of the disclosure.
Figure 6:
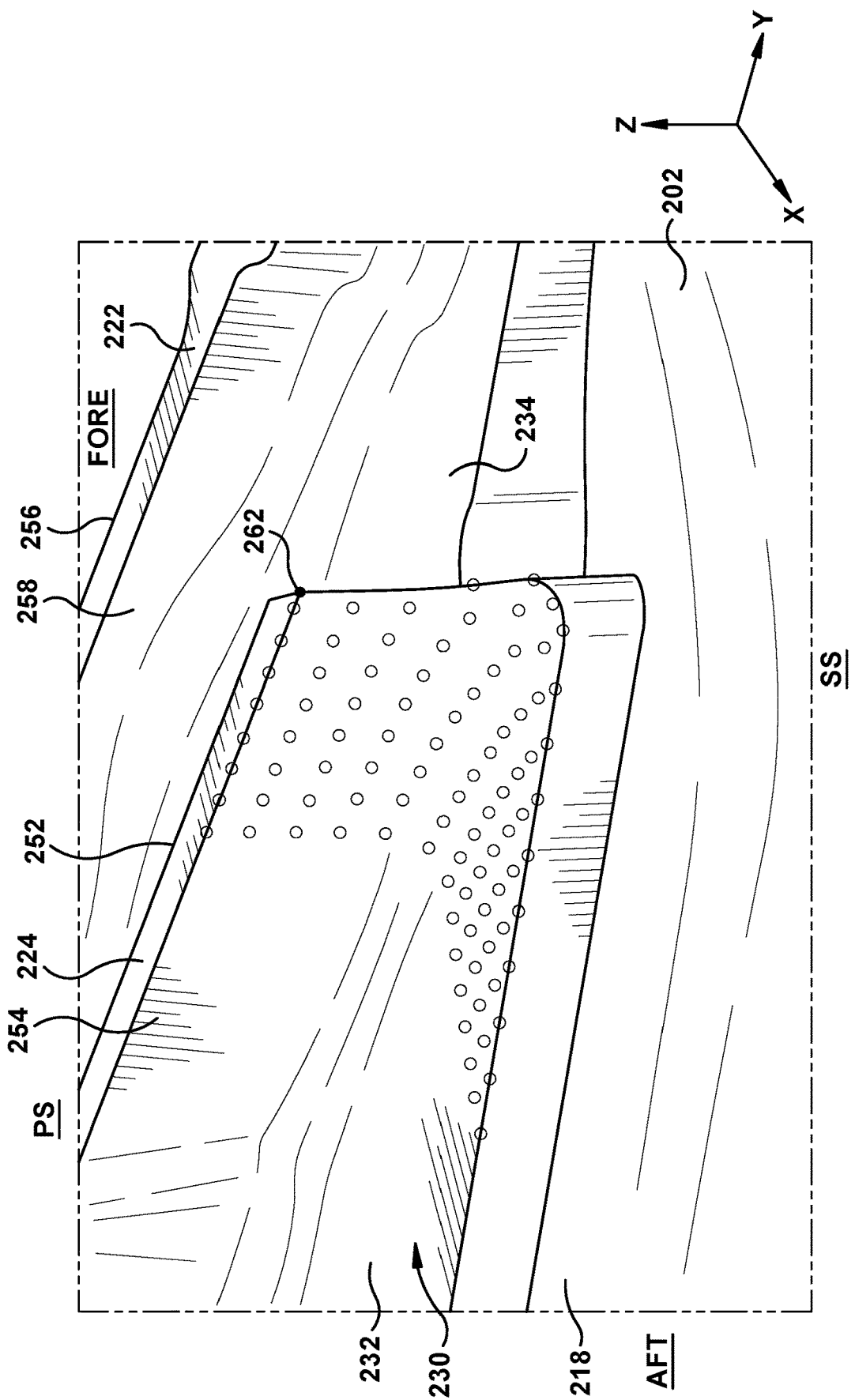
FIG. 6 shows a rear perspective view of a tip shroud including points of a rear tip rail, second downstream side surface profile, according to embodiments of the disclosure.
Figure 7:
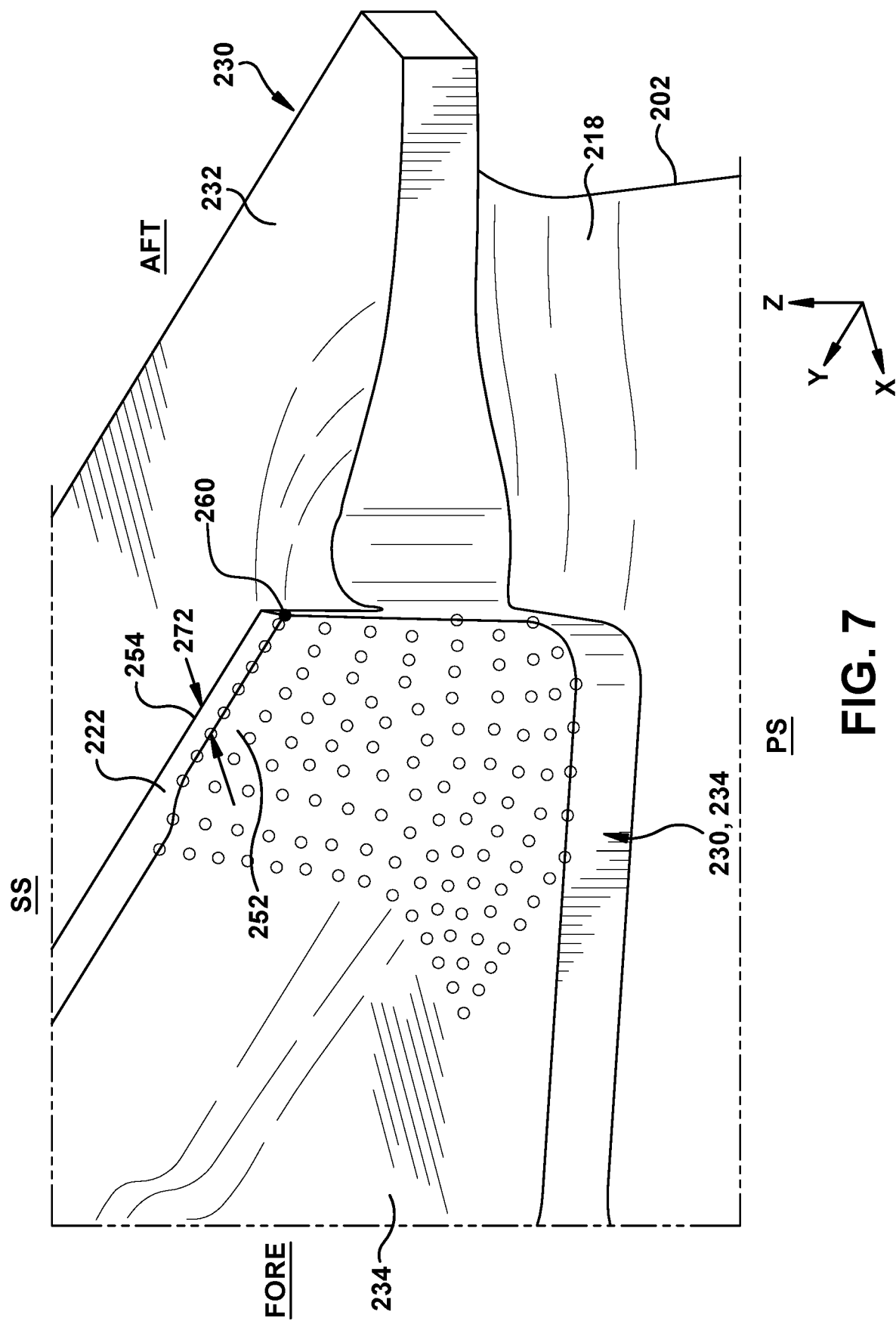
FIG. 7 shows a front perspective view of a tip shroud including points of a rear tip rail, upstream side surface profile, according to embodiments of the disclosure.
Figure 8:
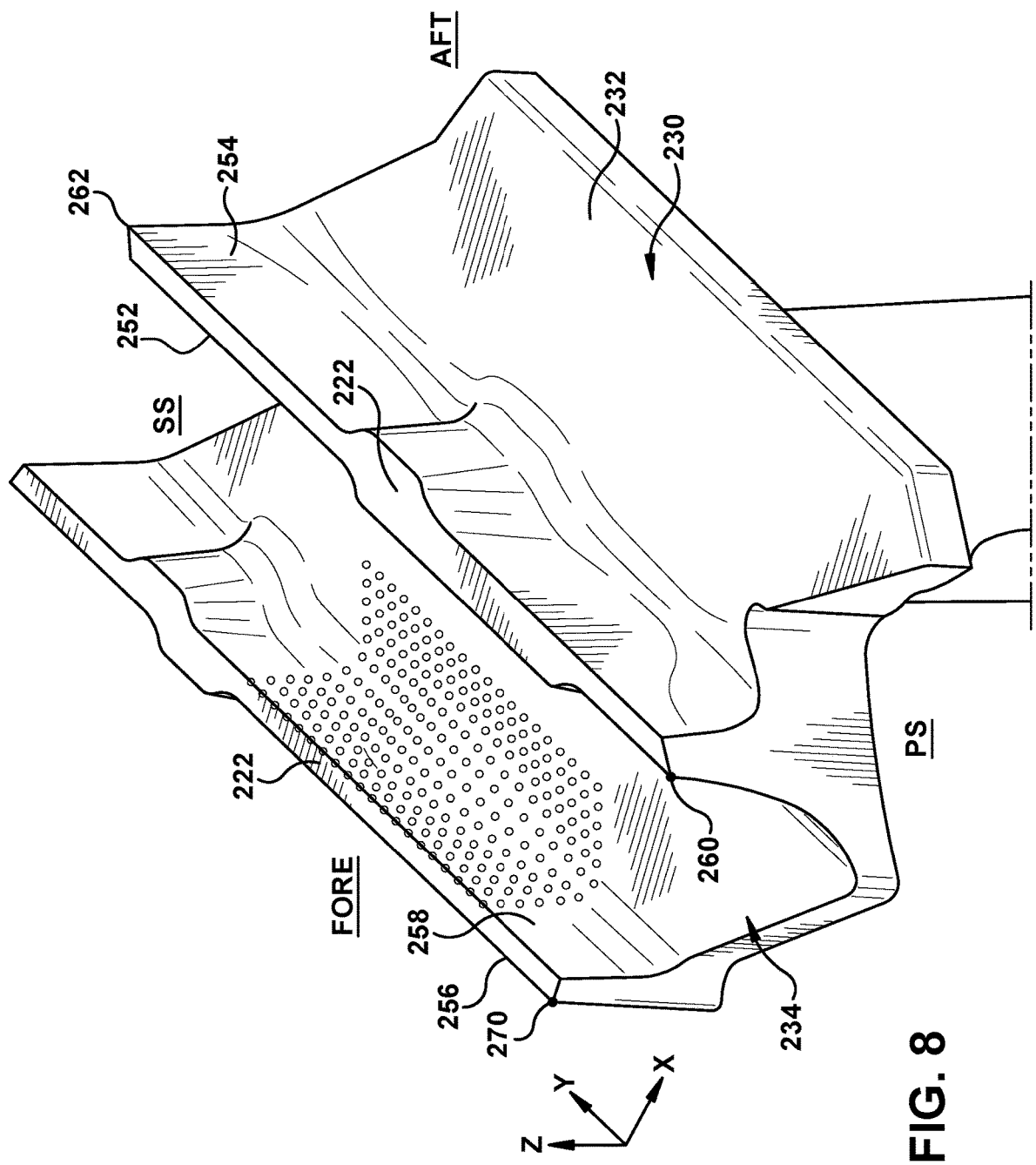
FIG. 8 shows a rear perspective view of a tip shroud including points of a front tip rail, downstream side surface profile, according to embodiments of the disclosure.

FIG. 4A shows a side perspective view of tip shroud 220 including a front tip rail 222 and a rear tip rail 224; FIG. 4B shows a schematic top-down view of tip shroud 220 with airfoil 202 overlayed thereon; FIG. 5 shows a rear perspective view of tip shroud 220 including points of a rear tip rail, first downstream side surface profile; FIG. 6 shows a rear perspective view of tip shroud 220 including points of a rear tip rail, second downstream side surface profile; FIG. 7 shows a front perspective view of tip shroud 220 including points of a rear tip rail, upstream side surface profile; and FIG. 8 shows a rear perspective view of tip shroud 220 including points of a front tip rail, downstream side surface profile. Data points illustrated in the drawings, e.g., FIGS. 5-8, are schematically represented, and may not match data points in the tables, described hereafter.

Legends indicating the X, Y and Z directions are illustrated in each figure, and additional labels include "fore," "aft," pressure side "PS," and suction side "SS." The abbreviated pressure side "PS" reference may be used herein to indicate the general pressure side of airfoil 202, while the numerical indicator "204" may indicate the sidewall of airfoil 202. Similarly, the abbreviated suction side "SS" reference may be used herein to indicate the general suction side of airfoil 202, while the numerical indicator "206" may indicate the sidewall of airfoil 202. Again, the arrowheads on the legends show the direction of positive coordinate values.

With reference to FIGS. 3-8 collectively, tip shroud 220 may include a platform 230 configured to couple to airfoil 202 at radial outer end 218 of the airfoil. Airfoil 202, as noted, includes pressure side 204 and suction side 206 opposing pressure side 204. Platform includes a rear portion 232 downstream of rear tip rail 224, and a front portion 234 between front tip rail 222 and rear tip rail 224.

Tip shroud 220 includes rear tip rail 224 extending radially from platform 230. Rear tip rail 224 has an upstream side 252 and a downstream side 254 opposing upstream side 252. Upstream side 252 of rear tip rail 224 faces generally circumferentially towards pressure side PS of airfoil 202 and melds smoothly according to the surface profiles described herein with front portion 234 of platform 230. Similarly, downstream side 254 of rear tip rail 224 faces generally circumferentially towards suction side SS of airfoil 202 and melds smoothly according to the surface profiles described herein with rear portion 232 of platform 230.

As shown in FIGS. 4A, 5 and 7, rear tip rail 224 also includes a (first) origin or point 260 on pressure side PS of airfoil 202 and at a radially outermost point farthest from pressure side 204 (FIG. 2) of airfoil 202. Origin point 260 is disposed on upstream side 252 of rear tip rail 224. As shown in FIGS. 4A, 6 and 8, rear tip rail 224 also includes a (third) origin or point 262 on suction side SS of airfoil 202 and at a radially outermost point farthest from suction side 206 of airfoil 202. Origin point 262 is disposed on downstream side 254 of rear tip rail 224. Origin 260 may act as an origin for certain surface profiles described herein, and origin 262 may act as an origin for certain other surface profiles described herein.

Tip shroud 220 also includes front tip rail 222 extending radially from platform 230 at a location axially forward of rear tip rail 224. Front tip rail 222 has an upstream side 256 and a downstream side 258 opposing upstream side 256. Upstream side 256 of front tip rail 222 faces generally circumferentially towards pressure side PS of airfoil 202. Downstream side 258 of front tip rail 222 faces generally circumferentially towards suction side SS of airfoil 202 and melds smoothly according to the surface profiles described herein with front portion 234 of platform 230. As shown in FIGS. 4A, 5 and 8, front tip rail 222 also includes a (second) origin or point 270 on pressure side PS of airfoil 202 and at a radially outermost point farthest from pressure side 204 (FIG. 2) of airfoil 202. Origin point 270 is disposed on upstream side 256 of front tip rail 222. Origin 270 may act as an origin for certain surface profiles described herein.

FIGS. 4A, 5 and 7 also show a set of normalization parameters that, as will be described further, may be used to make Cartesian coordinate values for the various surface profiles of tip shroud 220 non-denominational and scalable (and vice versa, make non-denominational Cartesian coordinate values actual coordinate values of a tip shroud). As shown in FIGS. 4A, 5 and 7, a "minimum rear tip rail X-wise extent" 272 is a minimum distance between rear tip rail upstream side 252 and rear tip rail downstream side 254 extending in the X-direction, i.e., perpendicular to axis A of rotor shaft 110 (FIG. 1) along the X-axis. While shown at a particular location, it is recognized that minimum rear tip rail X-wise extent 272 can be anywhere along the rear tip rail 224 axial length that includes upstream side 252 and downstream side 254, i.e., it excludes the angled ends of rear tip rail 224.

Referring to FIGS. 4A, 5-8, various surface profiles of tip shroud 220 according to embodiments of the disclosure will now be described. The surface profiles are each identified in the form of X, Y, Z coordinates listed in a number of tables, i.e., TABLES I, II, III, and IV. The X, Y, and Z coordinate values in TABLES I-IV have been expressed in normalized or non-dimensionalized form in values of from 0% to 100%, but it should be apparent that any or all of the values could instead be expressed in distance units so long as the percentages and proportions are maintained. To convert X, Y, Z values of TABLE I-IV to actual respective X, Y or Z coordinate values from the relevant origin (e.g., origin 260, 262 on rear tip rail 224, or origin 270 on front tip rail 222) at respective data points, in units of distance, such as inches or meters, the non-dimensional values given in TABLE I-IV can be multiplied by a normalization parameter value. As noted, the normalization parameter used herein is minimum rear tip rail X-wise extent 272. In any event, as noted, the X, Y, Z data points may be joined smoothly with one another (with lines and/or arcs) to form a surface profile for the tip rails using any now known or later developed curve fitting technique generating a curved surface appropriate for a tip shroud. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

The values in TABLES I-IV are non-dimensionalized values generated and shown to three decimal places for determining the various nominal surface profiles of tip shroud 220 at ambient, non-operating, or non-hot conditions, and do not take any coatings into account, though embodiments could account for other conditions and/or coatings. In certain embodiments, to allow for typical manufacturing tolerances and/or coating thicknesses, ±values can be added to the normalization parameter, i.e., minimum rear tip rail X-wise extent. For example, in one embodiment, a tolerance of +/−15 percent can be applied to minimum rear tip rail X-wise extent to define an envelope for the surface profile for a stress relief structure at cold or room temperature. In other embodiments, to allow for typical manufacturing tolerances and/or coating thicknesses, ±values can be added to the values listed in TABLE I-IV. In one embodiment, a tolerance of about 10 percent can be applied. For example, a tolerance of about 10 percent applied to an X value of a surface profile can define an X value at cold or room temperature. In other words, a distance of about 10 percent of a location in an X-direction can define a range of variation between measured points on an actual tip shroud surface and ideal positions of those points, particularly at a cold or room temperature, as embodied by the disclosure. The tip shroud surface profile configurations, as embodied herein, are robust to this range of variation without impairment of mechanical and aerodynamic functions.

The surface profiles can be scaled larger or smaller, such as geometrically, without impairment of operation. Such scaling can be facilitated by multiplying the normalized/non-dimensionalized values by a common scaling factor (i.e., the actual, desired distance of the normalization parameter), which may be a larger or smaller number of distance units than might have originally been used for a tip shroud, e.g., of a given tip rail axial length or minimum rear tip rail X-wise extent, as appropriate. For example, the non-dimensionalized values in TABLE I, particularly the X and Y values, could be multiplied uniformly by a scaling factor of 2, 0.5, or any other desired scaling factor of the relevant normalized parameter. In various embodiments, the X, Y, and Z distances, are scalable as a function of the same constant or number (e.g., minimum rear tip rail X-wise extent) to provide a scaled up or scaled down tip shroud. Alternatively, the values could be multiplied by a larger or smaller desired constant.

FIG. 5 shows a number of X, Y, and Z coordinate points that define a rear tip rail, first downstream side surface profile. In this embodiment, the first downstream side surface profile is near a pressure side (PS) end of rear tip rail 224. As will be described, rear tip rail 224 may also have a second downstream side surface profile defined by other Cartesian coordinates.

In one embodiment, downstream side 254 of rear tip rail 224 has a shape (at pressure side end) having a nominal profile substantially in accordance with Cartesian coordinate values of X, Y, and Z set forth in TABLE I (below) and originating at origin 260. The Cartesian coordinate values are non-dimensional values of from 0% to 100% convertible to distances by multiplying the X, Y, and Z values by a minimum rear tip rail X-wise extent 272, expressed in units of distance. That is, the normalization parameter for the X, Y, and Z coordinates is minimum rear tip rail X-wise extent 272. When scaling up or down, the X, Y, and Z coordinate values in TABLE I can be multiplied by the actual, desired minimum rear tip rail X-wise extent 272 to identify the corresponding actual X, Y, and Z coordinate values of rear tip rail 224 downstream side 254 surface profile near a pressure side end thereof. Collectively, the actual X, Y, and Z coordinate values created identify rear tip rail, first downstream side 254 surface profile, according to embodiments of the disclosure, at any desired size of tip shroud. As shown in FIG. 5, X, Y, and Z values may be connected by lines to define the rear tip rail, first downstream side 254 surface profile. The points may include surfaces of rear tip rail 224 and/or rear portion 232 of platform 230.

TABLE I

Rear Tip Rail, First Downstream Side
Surface Profile [non-dimensionalized values]

| | X | Y | Z |
|---|---|---|---|
| 1 | 10.543 | −4.778 | −3.945 |
| 2 | 11.522 | −4.778 | −3.697 |
| 3 | 12.500 | −4.778 | −3.450 |
| 4 | 9.822 | −3.667 | −4.057 |
| 5 | 11.161 | −3.667 | −3.719 |
| 6 | 12.500 | −3.667 | −3.379 |
| 7 | 9.101 | −2.556 | −4.155 |
| 8 | 10.237 | −2.556 | −3.884 |
| 9 | 11.368 | −2.556 | −3.597 |
| 10 | 12.500 | −2.556 | −3.311 |
| 11 | 8.379 | −1.445 | −4.170 |
| 12 | 9.768 | −1.445 | −3.933 |
| 13 | 11.134 | −1.445 | −3.590 |
| 14 | 12.500 | −1.445 | −3.243 |
| 15 | 7.658 | −0.334 | −4.110 |
| 16 | 8.889 | −0.334 | −4.013 |
| 17 | 10.103 | −0.334 | −3.785 |
| 18 | 11.302 | −0.334 | −3.482 |
| 19 | 12.500 | −0.334 | −3.179 |
| 20 | 6.936 | 0.777 | −3.989 |
| 21 | 8.068 | 0.777 | −3.995 |
| 22 | 9.194 | 0.777 | −3.890 |
| 23 | 10.304 | 0.777 | −3.671 |
| 24 | 11.402 | 0.777 | −3.393 |
| 25 | 12.500 | 0.777 | −3.115 |
| 26 | 1.000 | 1.888 | 0.105 |
| 27 | 1.088 | 1.888 | −1.009 |
| 28 | 1.202 | 1.888 | −2.120 |
| 29 | 1.423 | 1.888 | −3.214 |
| 30 | 6.214 | 1.888 | −3.822 |
| 31 | 7.274 | 1.888 | −3.911 |
| 32 | 8.338 | 1.888 | −3.900 |
| 33 | 9.396 | 1.888 | −3.789 |
| 34 | 10.438 | 1.888 | −3.576 |
| 35 | 11.469 | 1.888 | −3.315 |
| 36 | 12.500 | 1.888 | −3.054 |
| 37 | 1.000 | 3.000 | 0.165 |
| 38 | 1.076 | 3.000 | −0.792 |
| 39 | 1.160 | 3.000 | −1.747 |
| 40 | 1.302 | 3.000 | −2.696 |
| 41 | 1.581 | 3.000 | −3.612 |
| 42 | 2.261 | 3.000 | −4.244 |
| 43 | 5.504 | 3.000 | −3.733 |
| 44 | 6.516 | 3.000 | −3.786 |
| 45 | 7.527 | 3.000 | −3.851 |
| 46 | 8.539 | 3.000 | −3.823 |
| 47 | 9.544 | 3.000 | −3.703 |
| 48 | 10.536 | 3.000 | −3.492 |
| 49 | 11.518 | 3.000 | −3.243 |
| 50 | 12.500 | 3.000 | −2.994 |
| 51 | 1.000 | 4.111 | 0.221 |
| 52 | 1.076 | 4.111 | −0.733 |
| 53 | 1.154 | 4.111 | −1.687 |
| 54 | 1.286 | 4.111 | −2.635 |
| 55 | 1.544 | 4.111 | −3.555 |
| 56 | 2.162 | 4.111 | −4.256 |
| 57 | 3.100 | 4.111 | −4.250 |
| 58 | 5.159 | 4.111 | −3.754 |
| 59 | 6.221 | 4.111 | −3.743 |
| 60 | 7.281 | 4.111 | −3.805 |
| 61 | 8.343 | 4.111 | −3.790 |
| 62 | 9.400 | 4.111 | −3.674 |
| 63 | 10.440 | 4.111 | −3.459 |
| 64 | 11.470 | 4.111 | −3.197 |
| 65 | 12.500 | 4.111 | −2.936 |
| 66 | 1.000 | 5.222 | 0.277 |
| 67 | 1.081 | 5.222 | −0.752 |
| 68 | 1.162 | 5.222 | −1.780 |
| 69 | 1.300 | 5.222 | −2.803 |
| 70 | 1.616 | 5.222 | −3.782 |
| 71 | 2.378 | 5.222 | −4.426 |
| 72 | 3.379 | 5.222 | −4.263 |
| 73 | 4.356 | 5.222 | −3.936 |
| 74 | 5.377 | 5.222 | −3.793 |
| 75 | 6.408 | 5.222 | −3.772 |
| 76 | 7.440 | 5.222 | −3.802 |
| 77 | 8.470 | 5.222 | −3.754 |
| 78 | 9.492 | 5.222 | −3.614 |
| 79 | 10.499 | 5.222 | −3.387 |
| 80 | 11.500 | 5.222 | −3.134 |
| 81 | 12.500 | 5.222 | −2.881 |
| 82 | 1.000 | 6.333 | 0.331 |
| 83 | 1.082 | 6.333 | −0.713 |
| 84 | 1.164 | 6.333 | −1.757 |
| 85 | 1.267 | 6.333 | −2.800 |
| 86 | 1.548 | 6.333 | −3.806 |
| 87 | 2.256 | 6.333 | −4.542 |
| 88 | 3.272 | 6.333 | −4.457 |
| 89 | 4.248 | 6.333 | −4.081 |
| 90 | 5.278 | 6.333 | −3.895 |
| 91 | 6.323 | 6.333 | −3.834 |
| 92 | 7.371 | 6.333 | −3.827 |
| 93 | 8.416 | 6.333 | −3.750 |
| 94 | 9.450 | 6.333 | −3.584 |
| 95 | 10.469 | 6.333 | −3.341 |
| 96 | 11.484 | 6.333 | −3.083 |
| 97 | 12.500 | 6.333 | −2.826 |
| 98 | 1.000 | 7.444 | 0.384 |
| 99 | 1.083 | 7.444 | −0.681 |
| 100 | 1.168 | 7.444 | −1.745 |
| 101 | 1.251 | 7.444 | −2.810 |
| 102 | 1.453 | 7.444 | −3.854 |
| 103 | 2.104 | 7.444 | −4.671 |
| 104 | 3.134 | 7.444 | −4.681 |
| 105 | 4.116 | 7.444 | −4.265 |
| 106 | 5.158 | 7.444 | −4.039 |
| 107 | 6.220 | 7.444 | −3.937 |
| 108 | 7.286 | 7.444 | −3.881 |
| 109 | 8.347 | 7.444 | −3.759 |
| 110 | 9.394 | 7.444 | −3.557 |
| 111 | 10.430 | 7.444 | −3.297 |
| 112 | 11.466 | 7.444 | −3.036 |
| 113 | 12.500 | 7.444 | −2.774 |
| 114 | 1.000 | 8.555 | 0.434 |
| 115 | 1.086 | 8.555 | −0.650 |
| 116 | 1.170 | 8.555 | −1.732 |
| 117 | 1.256 | 8.555 | −2.815 |
| 118 | 1.372 | 8.555 | −3.894 |
| 119 | 1.960 | 8.555 | −4.779 |
| 120 | 2.994 | 8.555 | −4.871 |
| 121 | 3.998 | 8.555 | −4.457 |
| 122 | 5.054 | 8.555 | −4.210 |
| 123 | 6.132 | 8.555 | −4.074 |
| 124 | 7.211 | 8.555 | −3.946 |
| 125 | 8.282 | 8.555 | −3.769 |
| 126 | 9.341 | 8.555 | −3.523 |
| 127 | 10.393 | 8.555 | −3.256 |
| 128 | 11.447 | 8.555 | −2.990 |
| 129 | 12.500 | 8.555 | −2.723 |
| 130 | 1.000 | 9.666 | 0.483 |
| 131 | 1.087 | 9.666 | −0.615 |
| 132 | 1.172 | 9.666 | −1.712 |
| 133 | 1.259 | 9.666 | −2.810 |
| 134 | 1.346 | 9.666 | −3.906 |
| 135 | 1.844 | 9.666 | −4.851 |
| 136 | 2.882 | 9.666 | −4.996 |
| 137 | 3.920 | 9.666 | −4.632 |
| 138 | 4.992 | 9.666 | −4.387 |
| 139 | 6.076 | 9.666 | −4.193 |
| 140 | 7.158 | 9.666 | −3.993 |
| 141 | 8.232 | 9.666 | −3.755 |
| 142 | 9.299 | 9.666 | −3.485 |
| 143 | 10.367 | 9.666 | −3.215 |
| 144 | 11.433 | 9.666 | −2.945 |
| 145 | 12.500 | 9.666 | −2.675 |
| 146 | 1.000 | 10.777 | 0.529 |
| 147 | 1.087 | 10.777 | −0.577 |
| 148 | 1.174 | 10.777 | −1.683 |
| 149 | 1.261 | 10.777 | −2.790 |
| 150 | 1.348 | 10.777 | −3.895 |

TABLE I-continued

Rear Tip Rail, First Downstream Side
Surface Profile [non-dimensionalized values]

| | X | Y | Z |
|---|---|---|---|
| 151 | 1.776 | 10.777 | −4.879 |
| 152 | 2.817 | 10.777 | −5.056 |
| 153 | 3.883 | 10.777 | −4.754 |
| 154 | 4.960 | 10.777 | −4.489 |
| 155 | 6.043 | 10.777 | −4.245 |
| 156 | 7.122 | 10.777 | −3.989 |
| 157 | 8.198 | 10.777 | −3.716 |
| 158 | 9.273 | 10.777 | −3.444 |
| 159 | 10.349 | 10.777 | −3.172 |
| 160 | 11.424 | 10.777 | −2.900 |
| 161 | 12.500 | 10.777 | −2.627 |
| 162 | 1.000 | 11.888 | 0.574 |
| 163 | 1.087 | 11.888 | −0.532 |
| 164 | 1.174 | 11.888 | −1.639 |
| 165 | 1.261 | 11.888 | −2.744 |
| 166 | 1.348 | 11.888 | −3.851 |
| 167 | 1.774 | 11.888 | −4.833 |
| 168 | 2.821 | 11.888 | −5.033 |
| 169 | 3.897 | 11.888 | −4.761 |
| 170 | 4.971 | 11.888 | −4.489 |
| 171 | 6.047 | 11.888 | −4.216 |
| 172 | 7.122 | 11.888 | −3.944 |
| 173 | 8.198 | 11.888 | −3.672 |
| 174 | 9.273 | 11.888 | −3.400 |
| 175 | 10.349 | 11.888 | −3.127 |
| 176 | 11.424 | 11.888 | −2.855 |
| 177 | 12.500 | 11.888 | −2.583 |
| 178 | 1.000 | 13.000 | 0.617 |
| 179 | 1.087 | 13.000 | −0.489 |
| 180 | 1.173 | 13.000 | −1.594 |
| 181 | 1.261 | 13.000 | −2.700 |
| 182 | 1.348 | 13.000 | −3.804 |
| 183 | 1.781 | 13.000 | −4.783 |
| 184 | 2.827 | 13.000 | −4.987 |
| 185 | 3.902 | 13.000 | −4.716 |
| 186 | 4.977 | 13.000 | −4.444 |
| 187 | 6.051 | 13.000 | −4.172 |
| 188 | 7.126 | 13.000 | −3.900 |
| 189 | 8.201 | 13.000 | −3.627 |
| 190 | 9.276 | 13.000 | −3.355 |
| 191 | 10.350 | 13.000 | −3.084 |
| 192 | 11.426 | 13.000 | −2.812 |
| 193 | 12.500 | 13.000 | −2.540 |
| 194 | 1.000 | 14.111 | 0.658 |
| 195 | 1.087 | 14.111 | −0.446 |
| 196 | 1.173 | 14.111 | −1.550 |
| 197 | 1.260 | 14.111 | −2.654 |
| 198 | 1.348 | 14.111 | −3.757 |
| 199 | 1.796 | 14.111 | −4.730 |
| 200 | 2.840 | 14.111 | −4.943 |
| 201 | 3.913 | 14.111 | −4.672 |
| 202 | 4.987 | 14.111 | −4.400 |
| 203 | 6.060 | 14.111 | −4.129 |
| 204 | 7.133 | 14.111 | −3.856 |
| 205 | 8.207 | 14.111 | −3.585 |
| 206 | 9.280 | 14.111 | −3.313 |
| 207 | 10.353 | 14.111 | −3.042 |
| 208 | 11.427 | 14.111 | −2.770 |
| 209 | 12.500 | 14.111 | −2.499 |

FIG. 6 shows a number of X, Y, and Z coordinate points that define a rear tip rail, second downstream side 254 surface profile. In this embodiment, the second downstream side surface profile is near a suction side (SS) end of rear tip rail 224. As noted, rear tip rail 224 includes origin 262 on suction side SS of airfoil 202 and at a radial outermost point farthest from suction side 206 (FIG. 3) of airfoil 202.

In this embodiment, downstream side 254 of rear tip rail 224 near the suction side end of rear tip rail 224 has a shape having a nominal profile substantially in accordance with Cartesian coordinate values of X, Y, and Z set forth in TABLE II (below) and originating at origin 262. The Cartesian coordinate values are non-dimensional values of from 0% to 100% convertible to distances by multiplying the X, Y, and Z by minimum rear tip rail X-wise extent 272, expressed in units of distance. Here again, the normalization parameter for the X, Y, and Z coordinates is minimum rear tip rail X-wise extent 272 of rear tip rail 224. When scaling up or down, the X, Y, and Z coordinate values in TABLE II can be multiplied by the desired minimum rear tip rail X-wise extent 272 of rear tip rail 224 to identify the corresponding actual X, Y, and Z coordinate values of rear tip rail, second downstream side 254 surface profile. Collectively, the actual X, Y, and Z coordinate values created identify the rear tip rail, second downstream side 254 surface profile, according to embodiments of the disclosure, at any desired size of tip shroud. As shown in FIG. 6, X, Y, and Z values may be connected by lines to define the rear tip rail, second downstream side 254 surface profile. The points may include surfaces of rear tip rail 224 and/or rear portion 232 of platform 230.

TABLE II

Rear Tip Rail, Second Downstream Side
Surface Profile [non-dimensionalized values]

| | X | Y | Z |
|---|---|---|---|
| 1 | 0.000 | −8.333 | 0.059 |
| 2 | 0.090 | −8.333 | −1.078 |
| 3 | 0.179 | −8.333 | −2.216 |
| 4 | 0.269 | −8.333 | −3.354 |
| 5 | 0.362 | −8.333 | −4.492 |
| 6 | 0.993 | −8.333 | −5.393 |
| 7 | 2.101 | −8.333 | −5.472 |
| 8 | 3.208 | −8.333 | −5.192 |
| 9 | 4.314 | −8.333 | −4.913 |
| 10 | 5.420 | −8.333 | −4.633 |
| 11 | 6.527 | −8.333 | −4.353 |
| 12 | 7.633 | −8.333 | −4.073 |
| 13 | 8.740 | −8.333 | −3.793 |
| 14 | 9.847 | −8.333 | −3.513 |
| 15 | 0.000 | −7.222 | 0.057 |
| 16 | 0.091 | −7.222 | −1.105 |
| 17 | 0.183 | −7.222 | −2.266 |
| 18 | 0.274 | −7.222 | −3.428 |
| 19 | 0.413 | −7.222 | −4.583 |
| 20 | 1.196 | −7.222 | −5.397 |
| 21 | 2.339 | −7.222 | −5.414 |
| 22 | 3.469 | −7.222 | −5.128 |
| 23 | 4.599 | −7.222 | −4.843 |
| 24 | 5.729 | −7.222 | −4.556 |
| 25 | 6.859 | −7.222 | −4.271 |
| 26 | 7.988 | −7.222 | −3.985 |
| 27 | 9.118 | −7.222 | −3.699 |
| 28 | 0.000 | −6.111 | 0.053 |
| 29 | 0.093 | −6.111 | −1.135 |
| 30 | 0.187 | −6.111 | −2.324 |
| 31 | 0.281 | −6.111 | −3.512 |
| 32 | 0.519 | −6.111 | −4.668 |
| 33 | 1.434 | −6.111 | −5.381 |
| 34 | 2.612 | −6.111 | −5.348 |
| 35 | 3.768 | −6.111 | −5.056 |
| 36 | 4.923 | −6.111 | −4.764 |
| 37 | 6.079 | −6.111 | −4.472 |
| 38 | 7.234 | −6.111 | −4.179 |
| 39 | 8.390 | −6.111 | −3.887 |
| 40 | 0.000 | −5.000 | 0.047 |
| 41 | 0.096 | −5.000 | −1.171 |
| 42 | 0.192 | −5.000 | −2.388 |
| 43 | 0.288 | −5.000 | −3.607 |
| 44 | 0.680 | −5.000 | −4.745 |
| 45 | 1.712 | −5.000 | −5.345 |
| 46 | 2.922 | −5.000 | −5.276 |
| 47 | 4.108 | −5.000 | −4.976 |
| 48 | 5.292 | −5.000 | −4.676 |
| 49 | 6.477 | −5.000 | −4.377 |
| 50 | 7.661 | −5.000 | −4.077 |

TABLE II-continued

Rear Tip Rail, Second Downstream Side Surface Profile [non-dimensionalized values]

|    | X     | Y      | Z      |
|----|-------|--------|--------|
| 51 | 0.000 | -3.889 | 0.041  |
| 52 | 0.099 | -3.889 | -1.214 |
| 53 | 0.198 | -3.889 | -2.467 |
| 54 | 0.320 | -3.889 | -3.717 |
| 55 | 0.891 | -3.889 | -4.815 |
| 56 | 2.028 | -3.889 | -5.298 |
| 57 | 3.276 | -3.889 | -5.192 |
| 58 | 4.494 | -3.889 | -4.885 |
| 59 | 5.714 | -3.889 | -4.577 |
| 60 | 6.933 | -3.889 | -4.268 |
| 61 | 0.000 | -2.778 | 0.031  |
| 62 | 0.102 | -2.778 | -1.268 |
| 63 | 0.204 | -2.778 | -2.567 |
| 64 | 0.407 | -2.778 | -3.851 |
| 65 | 1.150 | -2.778 | -4.893 |
| 66 | 2.386 | -2.778 | -5.247 |
| 67 | 3.677 | -2.778 | -5.097 |
| 68 | 4.941 | -2.778 | -4.782 |
| 69 | 6.204 | -2.778 | -4.463 |
| 70 | 0.000 | -1.667 | 0.021  |
| 71 | 0.108 | -1.667 | -1.344 |
| 72 | 0.216 | -1.667 | -2.707 |
| 73 | 0.530 | -1.667 | -4.032 |
| 74 | 1.461 | -1.667 | -4.993 |
| 75 | 2.800 | -1.667 | -5.201 |
| 76 | 4.150 | -1.667 | -4.991 |
| 77 | 5.477 | -1.667 | -4.657 |
| 78 | 0.000 | -0.555 | 0.007  |
| 79 | 0.114 | -0.555 | -1.448 |
| 80 | 0.249 | -0.555 | -2.903 |
| 81 | 0.701 | -0.555 | -4.281 |
| 82 | 1.863 | -0.555 | -5.099 |
| 83 | 3.316 | -0.555 | -5.136 |
| 84 | 4.748 | -0.555 | -4.855 |
| 85 | 0.629 | 0.556  | -4.113 |
| 86 | 1.523 | 0.556  | -4.974 |
| 87 | 2.764 | 0.556  | -5.171 |
| 88 | 4.020 | 0.556  | -5.023 |
| 89 | 1.564 | 1.667  | -4.992 |
| 90 | 2.374 | 1.667  | -5.165 |
| 91 | 3.204 | 1.667  | -5.146 |

In another embodiment, tip shroud 220 may also include both first and second downstream side surface profiles of rear tip rail 224, as described herein relative to TABLES I and II.

FIG. 7 shows a number of X, Y, and Z coordinate points that define a rear tip rail, upstream side 252 surface profile. In this embodiment, upstream side 252 surface profile is near a pressure side (PS) end of rear tip rail 224.

Upstream side 252 of rear tip rail 224 has a shape having a nominal profile substantially in accordance with Cartesian coordinate values of X, Y, and Z set forth in TABLE III (below) and originating at origin 260. The Cartesian coordinate values are non-dimensional values of from 0% to 100% convertible to distances by multiplying the X, Y, and Z by minimum rear tip rail X-wise extent 272, expressed in units of distance. Here again, the normalization parameter for the X, Y, and Z coordinates is minimum rear tip rail X-wise extent 272 of rear tip rail 224. When scaling up or down, the X, Y, and Z coordinate values in TABLE III can be multiplied by the desired minimum rear tip rail X-wise extent 272 of rear tip rail 224 to identify the corresponding actual X, Y, and Z coordinate values of rear tip rail, upstream side 252 surface profile. Collectively, the actual X, Y, and Z coordinate values created identify the rear tip rail, upstream side 252 surface profile, according to embodiments of the disclosure, at any desired size of tip shroud. As shown in FIG. 7, X, Y, and Z values may be connected by lines to define the rear tip rail, upstream side 252 surface profile. The points may include surfaces of rear tip rail 224 and/or front portion 234 of platform 230.

TABLE III

Rear Tip Rail, Upstream Side Surface Profile [non-dimensionalized values]

|    | X      | Y      | Z      |
|----|--------|--------|--------|
| 1  | -3.360 | -1.889 | -7.289 |
| 2  | -2.327 | -1.889 | -7.007 |
| 3  | -1.436 | -1.889 | -6.431 |
| 4  | -4.110 | -0.778 | -7.412 |
| 5  | -2.967 | -0.778 | -7.123 |
| 6  | -1.864 | -0.778 | -6.719 |
| 7  | -1.050 | -0.778 | -5.881 |
| 8  | -0.586 | -0.778 | -4.800 |
| 9  | -4.831 | 0.333  | -7.531 |
| 10 | -3.587 | 0.333  | -7.215 |
| 11 | -2.344 | 0.333  | -6.889 |
| 12 | -1.296 | 0.333  | -6.173 |
| 13 | -0.670 | 0.333  | -5.060 |
| 14 | -0.347 | 0.333  | -3.817 |
| 15 | -0.201 | 0.333  | -2.542 |
| 16 | -0.101 | 0.333  | -1.262 |
| 17 | 0.000  | 0.333  | 0.019  |
| 18 | -5.553 | 1.444  | -7.651 |
| 19 | -4.214 | 1.444  | -7.312 |
| 20 | -2.877 | 1.444  | -6.973 |
| 21 | -1.616 | 1.444  | -6.443 |
| 22 | -0.783 | 1.444  | -5.359 |
| 23 | -0.381 | 1.444  | -4.041 |
| 24 | -0.217 | 1.444  | -2.672 |
| 25 | -0.108 | 1.444  | -1.295 |
| 26 | 0.000  | 1.444  | 0.080  |
| 27 | -6.182 | 2.555  | -7.750 |
| 28 | -4.761 | 2.555  | -7.390 |
| 29 | -3.340 | 2.555  | -7.030 |
| 30 | -1.939 | 2.555  | -6.610 |
| 31 | -0.896 | 2.555  | -5.609 |
| 32 | -0.392 | 2.555  | -4.239 |
| 33 | -0.230 | 2.555  | -2.782 |
| 34 | -0.114 | 2.555  | -1.321 |
| 35 | 0.000  | 2.555  | 0.140  |
| 36 | -6.182 | 3.666  | -7.691 |
| 37 | -4.914 | 3.666  | -7.370 |
| 38 | -3.647 | 3.666  | -7.049 |
| 39 | -2.379 | 3.666  | -6.727 |
| 40 | -1.258 | 3.666  | -6.085 |
| 41 | -0.564 | 3.666  | -4.989 |
| 42 | -0.308 | 3.666  | -3.712 |
| 43 | -0.204 | 3.666  | -2.409 |
| 44 | -0.102 | 3.666  | -1.104 |
| 45 | 0.000  | 3.666  | 0.199  |
| 46 | -6.182 | 4.777  | -7.633 |
| 47 | -5.038 | 4.777  | -7.343 |
| 48 | -3.892 | 4.777  | -7.054 |
| 49 | -2.748 | 4.777  | -6.764 |
| 50 | -1.642 | 4.777  | -6.366 |
| 51 | -0.807 | 4.777  | -5.545 |
| 52 | -0.380 | 4.777  | -4.453 |
| 53 | -0.278 | 4.777  | -3.276 |
| 54 | -0.186 | 4.777  | -2.100 |
| 55 | -0.092 | 4.777  | -0.922 |
| 56 | 0.000  | 4.777  | 0.256  |
| 57 | -6.182 | 5.888  | -7.579 |
| 58 | -5.033 | 5.888  | -7.287 |
| 59 | -3.886 | 5.888  | -6.996 |
| 60 | -2.737 | 5.888  | -6.706 |
| 61 | -1.622 | 5.888  | -6.319 |
| 62 | -0.766 | 5.888  | -5.516 |
| 63 | -0.371 | 5.888  | -4.414 |
| 64 | -0.279 | 5.888  | -3.233 |
| 65 | -0.186 | 5.888  | -2.052 |
| 66 | -0.093 | 5.888  | -0.871 |
| 67 | 0.000  | 5.888  | 0.310  |
| 68 | -6.182 | 7.000  | -7.525 |
| 69 | -5.140 | 7.000  | -7.261 |

TABLE III-continued

Rear Tip Rail, Upstream Side Surface Profile [non-dimensionalized values]

| | X | Y | Z |
|---|---|---|---|
| 70 | −4.098 | 7.000 | −6.997 |
| 71 | −3.056 | 7.000 | −6.733 |
| 72 | −2.023 | 7.000 | −6.434 |
| 73 | −1.112 | 7.000 | −5.877 |
| 74 | −0.537 | 7.000 | −4.983 |
| 75 | −0.377 | 7.000 | −3.921 |
| 76 | −0.263 | 7.000 | −2.852 |
| 77 | −0.169 | 7.000 | −1.781 |
| 78 | −0.084 | 7.000 | −0.709 |
| 79 | 0.000 | 7.000 | 0.363 |
| 80 | −6.182 | 8.111 | −7.473 |
| 81 | −5.258 | 8.111 | −7.239 |
| 82 | −4.332 | 8.111 | −7.005 |
| 83 | −3.408 | 8.111 | −6.771 |
| 84 | −2.500 | 8.111 | −6.482 |
| 85 | −1.701 | 8.111 | −5.966 |
| 86 | −1.136 | 8.111 | −5.207 |
| 87 | −0.904 | 8.111 | −4.283 |
| 88 | −0.703 | 8.111 | −3.351 |
| 89 | −0.520 | 8.111 | −2.414 |
| 90 | −0.356 | 8.111 | −1.474 |
| 91 | −0.209 | 8.111 | −0.532 |
| 92 | −0.079 | 8.111 | 0.414 |
| 93 | −6.182 | 9.222 | −7.423 |
| 94 | −5.287 | 9.222 | −7.196 |
| 95 | −4.391 | 9.222 | −6.970 |
| 96 | −3.494 | 9.222 | −6.743 |
| 97 | −2.637 | 9.222 | −6.411 |
| 98 | −1.929 | 9.222 | −5.825 |
| 99 | −1.521 | 9.222 | −5.006 |
| 100 | −1.383 | 9.222 | −4.092 |
| 101 | −1.246 | 9.222 | −3.179 |
| 102 | −1.103 | 9.222 | −2.265 |
| 103 | −0.953 | 9.222 | −1.354 |
| 104 | −0.797 | 9.222 | −0.443 |
| 105 | −0.617 | 9.222 | 0.463 |
| 106 | −6.182 | 10.333 | −7.375 |
| 107 | −5.366 | 10.333 | −7.169 |
| 108 | −4.548 | 10.333 | −6.962 |
| 109 | −3.731 | 10.333 | −6.755 |
| 110 | −2.934 | 10.333 | −6.489 |
| 111 | −2.248 | 10.333 | −6.006 |
| 112 | −1.779 | 10.333 | −5.313 |
| 113 | −1.606 | 10.333 | −4.491 |
| 114 | −1.481 | 10.333 | −3.657 |
| 115 | −1.357 | 10.333 | −2.824 |
| 116 | −1.232 | 10.333 | −1.990 |
| 117 | −1.108 | 10.333 | −1.156 |
| 118 | −0.983 | 10.333 | −0.323 |
| 119 | −0.859 | 10.333 | 0.510 |

In another embodiment, tip shroud 220 may also include both first and/or second downstream side 254 surface profiles of rear tip rail 224, as described herein relative to TABLES I and II, and/or upstream side 252 surface profile of rear tip rail 224, as described herein relative to TABLE III.

FIG. 8 shows a number of X, Y, and Z coordinate points that define a front tip rail, downstream side 258 surface profile. In this embodiment, downstream side surface profile of front tip rail 222 is between pressure side PS and suction side SS ends of front tip rail 222. As noted, front tip rail 222 includes origin 270 on pressure side PS of airfoil 202 and at a radial outermost point farthest from pressure side 204 (FIG. 3) of airfoil 202.

In this embodiment, downstream side 258 of front tip rail 222 has a shape having a nominal profile substantially in accordance with Cartesian coordinate values of X, Y, and Z set forth in TABLE IV (below) and originating at origin 270. The Cartesian coordinate values are non-dimensional values of from 0% to 100% convertible to distances by multiplying the X, Y, and Z by minimum rear tip rail X-wise extent 272, expressed in units of distance. Here again, the normalization parameter for the X, Y, and Z coordinates is minimum rear tip rail X-wise extent 272 of rear tip rail 224. When scaling up or down, the X, Y, and Z coordinate values in TABLE IV can be multiplied by the desired minimum rear tip rail X-wise extent 272 of rear tip rail 224 to identify the corresponding actual X, Y, and Z coordinate values of front tip rail, downstream side 258 surface profile. Collectively, the actual X, Y, and Z coordinate values created identify the front tip rail, downstream side 258 surface profile, according to embodiments of the disclosure, at any desired size of tip shroud. As shown in FIG. 8, X, Y, and Z values may be connected by lines to define the front tip rail, downstream side 258 surface profile. The points may include surfaces of front tip rail 222 and/or front portion 234 of platform 230.

TABLE IV

Front Tip Rail, Downstream Side Surface Profile [non-dimensionalized values]

| | X | Y | Z |
|---|---|---|---|
| 1 | 1.000 | 6.433 | 0.222 |
| 2 | 1.061 | 6.433 | −0.551 |
| 3 | 1.121 | 6.433 | −1.325 |
| 4 | 1.183 | 6.433 | −2.099 |
| 5 | 1.268 | 6.433 | −2.870 |
| 6 | 1.471 | 6.433 | −3.620 |
| 7 | 2.050 | 6.433 | −4.076 |
| 8 | 2.820 | 6.433 | −4.006 |
| 9 | 3.572 | 6.433 | −3.815 |
| 10 | 4.323 | 6.433 | −3.621 |
| 11 | 5.077 | 6.433 | −3.432 |
| 12 | 5.829 | 6.433 | −3.242 |
| 13 | 1.000 | 7.457 | 0.252 |
| 14 | 1.059 | 7.457 | −0.521 |
| 15 | 1.128 | 7.457 | −1.293 |
| 16 | 1.162 | 7.457 | −2.069 |
| 17 | 1.227 | 7.457 | −2.853 |
| 18 | 1.458 | 7.457 | −3.603 |
| 19 | 2.043 | 7.457 | −4.063 |
| 20 | 2.823 | 7.457 | −4.026 |
| 21 | 3.573 | 7.457 | −3.778 |
| 22 | 4.323 | 7.457 | −3.589 |
| 23 | 5.077 | 7.457 | −3.403 |
| 24 | 5.829 | 7.457 | −3.212 |
| 25 | 1.000 | 8.480 | 0.281 |
| 26 | 1.058 | 8.480 | −0.485 |
| 27 | 1.128 | 8.480 | −1.250 |
| 28 | 1.156 | 8.480 | −2.019 |
| 29 | 1.230 | 8.480 | −2.797 |
| 30 | 1.494 | 8.480 | −3.528 |
| 31 | 2.080 | 8.480 | −3.988 |
| 32 | 2.852 | 8.480 | −3.998 |
| 33 | 3.597 | 8.480 | −3.743 |
| 34 | 4.339 | 8.480 | −3.557 |
| 35 | 5.084 | 8.480 | −3.373 |
| 36 | 5.829 | 8.480 | −3.183 |
| 37 | 1.000 | 9.502 | 0.308 |
| 38 | 1.058 | 9.502 | −0.446 |
| 39 | 1.124 | 9.502 | −1.197 |
| 40 | 1.159 | 9.502 | −1.952 |
| 41 | 1.268 | 9.502 | −2.708 |
| 42 | 1.569 | 9.502 | −3.407 |
| 43 | 2.148 | 9.502 | −3.865 |
| 44 | 2.900 | 9.502 | −3.932 |
| 45 | 3.634 | 9.502 | −3.710 |
| 46 | 4.364 | 9.502 | −3.525 |
| 47 | 5.098 | 9.502 | −3.343 |
| 48 | 5.829 | 9.502 | −3.157 |
| 49 | 1.000 | 10.525 | 0.332 |
| 50 | 1.057 | 10.525 | −0.403 |
| 51 | 1.119 | 10.525 | −1.139 |
| 52 | 1.173 | 10.525 | −1.876 |

TABLE IV-continued

Front Tip Rail, Downstream Side
Surface Profile [non-dimensionalized values]

| | X | Y | Z |
|---|---|---|---|
| 53 | 1.329 | 10.525 | −2.600 |
| 54 | 1.668 | 10.525 | −3.258 |
| 55 | 2.237 | 10.525 | −3.710 |
| 56 | 2.959 | 10.525 | −3.839 |
| 57 | 3.682 | 10.525 | −3.676 |
| 58 | 4.398 | 10.525 | −3.492 |
| 59 | 5.113 | 10.525 | −3.313 |
| 60 | 5.829 | 10.525 | −3.131 |
| 61 | 1.000 | 11.549 | 0.355 |
| 62 | 1.057 | 11.549 | −0.362 |
| 63 | 1.112 | 11.549 | −1.080 |
| 64 | 1.196 | 11.549 | −1.795 |
| 65 | 1.406 | 11.549 | −2.481 |
| 66 | 1.780 | 11.549 | −3.095 |
| 67 | 2.337 | 11.549 | −3.541 |
| 68 | 3.024 | 11.549 | −3.730 |
| 69 | 3.734 | 11.549 | −3.640 |
| 70 | 4.433 | 11.549 | −3.462 |
| 71 | 5.131 | 11.549 | −3.285 |
| 72 | 5.829 | 11.549 | −3.108 |
| 73 | 1.000 | 12.572 | 0.378 |
| 74 | 1.057 | 12.572 | −0.322 |
| 75 | 1.108 | 12.572 | −1.022 |
| 76 | 1.223 | 12.572 | −1.715 |
| 77 | 1.486 | 12.572 | −2.362 |
| 78 | 1.891 | 12.572 | −2.935 |
| 79 | 2.436 | 12.572 | −3.373 |
| 80 | 3.090 | 12.572 | −3.613 |
| 81 | 3.786 | 12.572 | −3.601 |
| 82 | 4.468 | 12.572 | −3.432 |
| 83 | 5.148 | 12.572 | −3.258 |
| 84 | 5.829 | 12.572 | −3.086 |
| 85 | 1.000 | 13.595 | 0.399 |
| 86 | 1.056 | 13.595 | −0.287 |
| 87 | 1.107 | 13.595 | −0.972 |
| 88 | 1.257 | 13.595 | −1.640 |
| 89 | 1.562 | 13.595 | −2.255 |
| 90 | 1.990 | 13.595 | −2.791 |
| 91 | 2.523 | 13.595 | −3.222 |
| 92 | 3.148 | 13.595 | −3.502 |
| 93 | 3.828 | 13.595 | −3.559 |
| 94 | 4.497 | 13.595 | −3.405 |
| 95 | 5.162 | 13.595 | −3.233 |
| 96 | 5.829 | 13.595 | −3.066 |
| 97 | 1.000 | 14.619 | 0.418 |
| 98 | 1.054 | 14.619 | −0.257 |
| 99 | 1.109 | 14.619 | −0.930 |
| 100 | 1.292 | 14.619 | −1.578 |
| 101 | 1.623 | 14.619 | −2.167 |
| 102 | 2.063 | 14.619 | −2.680 |
| 103 | 2.590 | 14.619 | −3.103 |
| 104 | 3.194 | 14.619 | −3.405 |
| 105 | 3.859 | 14.619 | −3.513 |
| 106 | 4.519 | 14.619 | −3.379 |
| 107 | 5.173 | 14.619 | −3.211 |
| 108 | 5.829 | 14.619 | −3.047 |
| 109 | 1.000 | 15.642 | 0.434 |
| 110 | 1.053 | 15.642 | −0.231 |
| 111 | 1.112 | 15.642 | −0.898 |
| 112 | 1.321 | 15.642 | −1.531 |
| 113 | 1.667 | 15.642 | −2.102 |
| 114 | 2.111 | 15.642 | −2.602 |
| 115 | 2.634 | 15.642 | −3.019 |
| 116 | 3.226 | 15.642 | −3.330 |
| 117 | 3.877 | 15.642 | −3.471 |
| 118 | 4.531 | 15.642 | −3.357 |
| 119 | 5.180 | 15.642 | −3.193 |
| 120 | 5.829 | 15.642 | −3.029 |
| 121 | 1.000 | 16.667 | 0.451 |
| 122 | 1.053 | 16.667 | −0.212 |
| 123 | 1.113 | 16.667 | −0.876 |
| 124 | 1.336 | 16.667 | −1.500 |
| 125 | 1.689 | 16.667 | −2.063 |
| 126 | 2.136 | 16.667 | −2.557 |
| 127 | 2.656 | 16.667 | −2.970 |
| 128 | 3.241 | 16.667 | −3.286 |
| 129 | 3.887 | 16.667 | −3.446 |
| 130 | 4.538 | 16.667 | −3.338 |
| 131 | 5.183 | 16.667 | −3.177 |
| 132 | 5.829 | 16.667 | −3.012 |
| 133 | 1.000 | 17.690 | 0.465 |
| 134 | 1.053 | 17.690 | −0.199 |
| 135 | 1.110 | 17.690 | −0.863 |
| 136 | 1.329 | 17.690 | −1.491 |
| 137 | 1.683 | 17.690 | −2.055 |
| 138 | 2.130 | 17.690 | −2.549 |
| 139 | 2.650 | 17.690 | −2.963 |
| 140 | 3.237 | 17.690 | −3.280 |
| 141 | 3.884 | 17.690 | −3.439 |
| 142 | 4.537 | 17.690 | −3.325 |
| 143 | 5.183 | 17.690 | −3.162 |
| 144 | 5.829 | 17.690 | −2.998 |
| 145 | 1.000 | 18.713 | 0.478 |
| 146 | 1.054 | 18.713 | −0.193 |
| 147 | 1.108 | 18.713 | −0.865 |
| 148 | 1.303 | 18.713 | −1.506 |
| 149 | 1.646 | 18.713 | −2.085 |
| 150 | 2.088 | 18.713 | −2.591 |
| 151 | 2.610 | 18.713 | −3.012 |
| 152 | 3.209 | 18.713 | −3.321 |
| 153 | 3.867 | 18.713 | −3.446 |
| 154 | 4.523 | 18.713 | −3.316 |
| 155 | 5.177 | 18.713 | −3.151 |
| 156 | 5.829 | 18.713 | −2.986 |
| 157 | 1.000 | 19.737 | 0.489 |
| 158 | 1.054 | 19.737 | −0.196 |
| 159 | 1.108 | 19.737 | −0.881 |
| 160 | 1.260 | 19.737 | −1.547 |
| 161 | 1.572 | 19.737 | −2.156 |
| 162 | 2.003 | 19.737 | −2.688 |
| 163 | 2.534 | 19.737 | −3.122 |
| 164 | 3.154 | 19.737 | −3.411 |
| 165 | 3.828 | 19.737 | −3.461 |
| 166 | 4.497 | 19.737 | −3.311 |
| 167 | 5.163 | 19.737 | −3.143 |
| 168 | 5.829 | 19.737 | −2.975 |
| 169 | 1.000 | 20.760 | 0.499 |
| 170 | 1.056 | 20.760 | −0.205 |
| 171 | 1.111 | 20.760 | −0.907 |
| 172 | 1.209 | 20.760 | −1.602 |
| 173 | 1.478 | 20.760 | −2.251 |
| 174 | 1.893 | 20.760 | −2.818 |
| 175 | 2.434 | 20.760 | −3.270 |
| 176 | 3.084 | 20.760 | −3.529 |
| 177 | 3.778 | 20.760 | −3.479 |
| 178 | 4.462 | 20.760 | −3.311 |
| 179 | 5.146 | 20.760 | −3.138 |
| 180 | 5.829 | 20.760 | −2.965 |
| 181 | 1.000 | 21.783 | 0.507 |
| 182 | 1.056 | 21.783 | −0.216 |
| 183 | 1.116 | 21.783 | −0.937 |
| 184 | 1.159 | 21.783 | −1.663 |
| 185 | 1.381 | 21.783 | −2.353 |
| 186 | 1.778 | 21.783 | −2.959 |
| 187 | 2.330 | 21.783 | −3.428 |
| 188 | 3.010 | 21.783 | −3.650 |
| 189 | 3.723 | 21.783 | −3.498 |
| 190 | 4.426 | 21.783 | −3.313 |
| 191 | 5.127 | 21.783 | −3.135 |
| 192 | 5.829 | 21.783 | −2.957 |
| 193 | 1.000 | 22.807 | 0.513 |
| 194 | 1.057 | 22.807 | −0.226 |
| 195 | 1.120 | 22.807 | −0.965 |
| 196 | 1.121 | 22.807 | −1.717 |
| 197 | 1.298 | 22.807 | −2.445 |
| 198 | 1.673 | 22.807 | −3.085 |
| 199 | 2.234 | 22.807 | −3.571 |
| 200 | 2.944 | 22.807 | −3.751 |
| 201 | 3.674 | 22.807 | −3.512 |
| 202 | 4.392 | 22.807 | −3.316 |

TABLE IV-continued

Front Tip Rail, Downstream Side
Surface Profile [non-dimensionalized values]

| | X | Y | Z |
|---|---|---|---|
| 203 | 5.110 | 22.807 | −3.132 |
| 204 | 5.829 | 22.807 | −2.950 |
| 205 | 1.000 | 23.831 | 0.519 |
| 206 | 1.057 | 23.831 | −0.233 |
| 207 | 1.104 | 23.831 | −1.752 |
| 208 | 1.122 | 23.831 | −0.985 |
| 209 | 1.246 | 23.831 | −2.506 |
| 210 | 1.601 | 23.831 | −3.173 |
| 211 | 2.168 | 23.831 | −3.671 |
| 212 | 2.899 | 23.831 | −3.806 |
| 213 | 3.639 | 23.831 | −3.518 |
| 214 | 4.368 | 23.831 | −3.317 |
| 215 | 5.098 | 23.831 | −3.130 |
| 216 | 5.829 | 23.831 | −2.945 |
| 217 | 1.000 | 24.854 | 0.522 |
| 218 | 1.058 | 24.854 | −0.235 |
| 219 | 1.119 | 24.854 | −1.759 |
| 220 | 1.123 | 24.854 | −0.989 |
| 221 | 1.241 | 24.854 | −2.518 |
| 222 | 1.579 | 24.854 | −3.200 |
| 223 | 2.144 | 24.854 | −3.701 |
| 224 | 2.886 | 24.854 | −3.791 |
| 225 | 3.626 | 24.854 | −3.513 |
| 226 | 4.359 | 24.854 | −3.315 |
| 227 | 5.094 | 24.854 | −3.128 |
| 228 | 5.829 | 24.854 | −2.941 |
| 229 | 1.000 | 25.878 | 0.524 |
| 230 | 1.060 | 25.878 | −0.226 |
| 231 | 1.121 | 25.878 | −0.975 |
| 232 | 1.174 | 25.878 | −1.725 |
| 233 | 1.302 | 25.878 | −2.463 |
| 234 | 1.624 | 25.878 | −3.141 |
| 235 | 2.181 | 25.878 | −3.635 |
| 236 | 2.916 | 25.878 | −3.683 |
| 237 | 3.642 | 25.878 | −3.492 |
| 238 | 4.371 | 25.878 | −3.309 |
| 239 | 5.100 | 25.878 | −3.125 |
| 240 | 5.829 | 25.878 | −2.939 |

In another embodiment, tip shroud 220 may also include both first and/or second downstream side 254 surface profiles of rear tip rail 224, as described herein relative to TABLES I and II, and/or upstream side 252 surface profile of rear tip rail 224, as described herein relative to TABLE III, and/or downstream side 258 surface profile of front tip rail 222, as described herein relative to TABLE IV.

The X, Y, Z data points from the respective TABLES may be joined smoothly with one another (with lines and/or arcs) to form a surface profile for the (two) downstream sides and the upstream side of the rear tip rail and the downstream side of the front tip rail, using any now known or later developed curve fitting technique generating a curved surface appropriate for a tip shroud. Curve fitting techniques may include but are not limited to: extrapolation, interpolation, smoothing, polynomial regression, and/or other mathematical curve fitting functions. The curve fitting technique may be performed manually and/or computationally, e.g., through statistical and/or numerical-analysis software.

Embodiments of the disclosure provide surface profiles that improve the aerodynamic characteristics of the tip shrouds and/or tip rails thereon and that reduce losses in system and turbine operation, performance, thrust, efficiency, reliability, and power.

The apparatus and devices of the present disclosure are not limited to any one particular turbomachine, engine, turbine, jet engine, power generation system or other system, and may be used with turbomachines such as aircraft systems, power generation systems (e.g., simple cycle, combined cycle), and/or other systems (e.g., nuclear reactor). Additionally, the apparatus of the present disclosure may be used with other systems not described herein that may benefit from the increased efficiency of the apparatus and devices described herein.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," is not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Substantially" as applied to a particular value of a range applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

We claim:

1. A turbine blade tip shroud, comprising:
a platform configured to couple to an airfoil of a turbine blade at a radial outer end of the airfoil, the airfoil having a pressure side and a suction side opposing the pressure side;
a rear tip rail extending radially from the platform, the rear tip rail having a downstream side, an upstream side opposing the downstream side and a first origin on the pressure side of the airfoil and at a radial outermost point farthest from the pressure side of the airfoil; and
a front tip rail extending radially from the platform at a location axially forward of the rear tip rail, the front tip rail having a downstream side, an upstream side opposing the downstream side and a second origin on the pressure side of the airfoil and at a radial outermost point farthest from the pressure side of the airfoil, and
wherein the downstream side of the rear tip rail has a shape having a nominal profile in accordance with Cartesian coordinate values of X, Y, and Z set forth in TABLE I and originating at the first origin, wherein the Cartesian coordinate values of X, Y, and Z set forth in TABLE I are non-dimensional values of from 0% to 100% convertible to distances by multiplying the Cartesian coordinate values of X, Y, and Z set forth in TABLE I by a minimum rear tip rail X-wise extent expressed in units of distance, and wherein the Cartesian coordinate values of X, Y, and Z set forth TABLE I are connected by lines to define a rear tip rail, first downstream side surface profile.

2. The turbine blade tip shroud of claim 1, wherein the turbine blade includes a second stage blade.

3. The turbine blade tip shroud of claim 1, wherein the rear tip rail further includes a third origin on the suction side of the airfoil and at a radial outermost point farthest from the suction side of the airfoil, and wherein the downstream side of the rear tip rail has a shape having a nominal profile in accordance with Cartesian coordinate values of X, Y, Z set forth in TABLE II and originating at the third origin, wherein the Cartesian coordinate values of X, Y, Z set forth in TABLE II are non-dimensional values of from 0% to 100% convertible to distances by multiplying the values by the minimum rear tip rail X-wise extent, and wherein the X and Y values set forth in TABLE II are joined smoothly to define a rear tip rail, second downstream side surface profile.

4. The turbine blade tip shroud of claim 1, wherein the upstream side of the rear tip rail has a shape having a nominal profile in accordance with Cartesian coordinate values of X, Y, and Z set forth in TABLE III and originating at the first origin, wherein the Cartesian coordinate values of X, Y, and Z set forth in TABLE III are non-dimensional values of from 0% to 100% convertible to distances by multiplying the Cartesian coordinate values of X, Y, and Z set forth in TABLE III by the minimum rear tip rail X-wise extent expressed in units of distance, and wherein the Cartesian coordinate values of X, Y, and Z set forth in TABLE III are connected by lines to define a rear tip rail, upstream side surface profile.

5. The turbine blade tip shroud of claim 1, wherein the downstream side of the front tip rail has a shape having a nominal profile in accordance with Cartesian coordinate values of X, Y, Z set forth in TABLE IV and originating at the second origin, wherein the Cartesian coordinate values of X, Y, Z set forth in TABLE IV are non-dimensional values of from 0% to 100% convertible to distances by multiplying the Cartesian coordinate values of X, Y, and Z set forth in TABLE IV by the minimum rear tip rail X-wise extent, and wherein the Cartesian coordinate values of X, Y, and Z set forth in TABLE IV are joined smoothly with one another to define a front tip rail, downstream side surface profile.

6. A turbine blade tip shroud, comprising:
a platform configured to couple to an airfoil of a turbine blade at a radial outer end of the airfoil, the airfoil having a pressure side and a suction side opposing the pressure side;
a rear tip rail extending radially from the platform, the rear tip rail having a downstream side, an upstream side opposing the downstream side and a first origin on the pressure side of the airfoil and at a radial outermost point farthest from the pressure side of the airfoil; and
a front tip rail extending radially from the platform at a location axially forward of the rear tip rail, the front tip rail having a downstream side, an upstream side opposing the downstream side and a second origin on the pressure side of the airfoil and at a radial outermost point farthest from the pressure side of the airfoil, and
wherein the rear tip rail further includes a third origin on the suction side of the airfoil and at a radial outermost point farthest from the suction side of the airfoil, and wherein the downstream side of the rear tip rail has a shape having a nominal profile in accordance with Cartesian coordinate values of X, Y, Z and thickness values set forth in TABLE II and originating at the third origin, wherein the Cartesian coordinate values set forth in TABLE II are non-dimensional values of from 0% to 100% convertible to distances by multiplying the Cartesian coordinate values of X, Y, Z set forth in TABLE II by a minimum rear tip rail X-wise extent, and wherein the X and Y values set forth in TABLE II are joined smoothly to define a rear tip rail, first downstream side surface profile.

7. The turbine blade tip shroud of claim 6, wherein the turbine blade includes a second stage blade.

8. The turbine blade tip shroud of claim 6, wherein the upstream side of the rear tip rail has a shape having a nominal profile in accordance with Cartesian coordinate values of X, Y, and Z set forth in TABLE III and originating at the first origin, wherein the Cartesian coordinate values of X, Y, and Z set forth in TABLE III are non-dimensional values of from 0% to 100% convertible to distances by multiplying the Cartesian coordinate values of X, Y, and Z set forth in TABLE III by the minimum rear tip rail X-wise extent expressed in units of distance, and wherein the Cartesian coordinate values of X, Y, and Z set forth in TABLE III are connected by lines to define a rear tip rail, upstream side surface profile.

9. The turbine blade tip shroud of claim 8, wherein the downstream side of the rear tip rail has a shape having a nominal profile in accordance with Cartesian coordinate values of X, Y, and Z set forth in TABLE I and originating at the first origin, wherein the Cartesian coordinate values are non-dimensional values of from 0% to 100% convertible to distances by multiplying the Cartesian coordinate values of X, Y, and Z set forth in TABLE I by the minimum rear tip rail X-wise extent expressed in units of distance, and wherein the Cartesian coordinate values of X, Y, and Z set forth in TABLE I are connected by lines to define a rear tip rail, second downstream side surface profile.

10. The turbine blade tip shroud of claim 6, wherein the downstream side of the front tip rail has a shape having a nominal profile in accordance with Cartesian coordinate values of X, Y, Z set forth in TABLE IV and originating at the second origin, wherein the Cartesian coordinate values of X, Y, Z set forth in TABLE IV are non-dimensional values of from 0% to 100% convertible to distances by multiplying the Cartesian coordinate values of X, Y, and Z set forth in TABLE IV by the minimum rear tip rail X-wise extent, and wherein the Cartesian coordinate values of X, Y, and Z set forth in TABLE IV are joined smoothly with one another to define a front tip rail, downstream side surface profile.

11. A turbine blade tip shroud, comprising:
a platform configured to couple to an airfoil of a turbine blade at a radial outer end of the airfoil, the airfoil having a pressure side and a suction side opposing the pressure side;
a rear tip rail extending radially from the platform, the rear tip rail having a downstream side, an upstream side opposing the downstream side and a first origin on the pressure side of the airfoil and at a radial outermost point farthest from the pressure side of the airfoil; and
a front tip rail extending radially from the platform at a location axially forward of the rear tip rail, the front tip rail having a downstream side, an upstream side opposing the downstream side and a second origin on the pressure side of the airfoil and at a radial outermost point farthest from the pressure side of the airfoil, and
wherein the upstream side of the rear tip rail has a shape having a nominal profile in accordance with Cartesian coordinate values of X, Y, and Z set forth in TABLE III and originating at the first origin, wherein the Cartesian coordinate values X, Y, Z set forth in TABLE III are non-dimensional values of from 0% to 100% convertible to distances by multiplying the Cartesian coordinate values of X, Y, and Z set forth in TABLE III by a minimum rear tip rail X-wise extent expressed in units of distance, and wherein the Cartesian coordinate values of X, Y, and Z set forth in TABLE III are connected by lines to define a rear tip rail, upstream side surface profile.

12. The turbine blade tip shroud of claim 11, wherein the turbine blade includes a second stage blade.

13. The turbine blade tip shroud of claim 11, wherein the downstream side of the front tip rail has a shape having a nominal profile in accordance with Cartesian coordinate values of X, Y, Z set forth in TABLE IV and originating at the second origin, wherein the Cartesian coordinate values are non-dimensional values of from 0% to 100% convertible to distances by multiplying the Cartesian coordinate values of X, Y, and Z set forth in TABLE IV by the minimum rear tip rail X-wise extent, and wherein the Cartesian coordinate values of X, Y, and Z set forth in TABLE IV are joined smoothly with one another to define a front tip rail, downstream side surface profile.

14. The turbine blade tip shroud of claim 13, wherein the downstream side of the rear tip rail has a shape having a nominal profile in accordance with Cartesian coordinate values of X, Y, and Z set forth in TABLE I and originating at the first origin, wherein the Cartesian coordinate values X, Y, Z set forth in TABLE I are non-dimensional values of from 0% to 100% convertible to distances by multiplying the Cartesian coordinate values of X, Y, and Z set forth in TABLE I by the minimum rear tip rail X-wise extent expressed in units of distance, and wherein the Cartesian coordinate values of X, Y, and Z set forth in TABLE I are connected by lines to define a rear tip rail, first downstream side surface profile.

15. The turbine blade tip shroud of claim 13, wherein the rear tip rail further includes a third origin on the suction side of the airfoil and at a radial outermost point farthest from the suction side of the airfoil, and wherein the downstream side of the rear tip rail has a shape having a nominal profile in accordance with Cartesian coordinate values of X, Y, Z and thickness values set forth in TABLE II and originating at the third origin, wherein the Cartesian coordinate values X, Y, Z set forth in TABLE II are non-dimensional values of from 0% to 100% convertible to distances by multiplying the values by the minimum rear tip rail X-wise extent, and wherein the X and Y values set forth in TABLE II are joined smoothly to define a rear tip rail, second downstream side surface profile.

16. A turbine blade tip shroud, comprising:
a platform configured to couple to an airfoil of a turbine blade at a radial outer end of the airfoil, the airfoil having a pressure side and a suction side opposing the pressure side;
a rear tip rail extending radially from the platform, the rear tip rail having a downstream side, an upstream side opposing the downstream side and a first origin on the pressure side of the airfoil and at a radial outermost point farthest from the pressure side of the airfoil; and
a front tip rail extending radially from the platform at a location axially forward of the rear tip rail, the front tip rail having a downstream side, an upstream side opposing the downstream side and a second origin on the pressure side of the airfoil and at a radial outermost point farthest from the pressure side of the airfoil, and wherein the downstream side of the front tip rail has a shape having a nominal profile in accordance with Cartesian coordinate values of X, Y, Z set forth in TABLE IV and originating at the second origin, wherein the Cartesian coordinate values X, Y, Z set forth in TABLE IV are non-dimensional values of from 0% to 100% convertible to distances by multiplying the Cartesian coordinate values of X, Y, and Z set forth in TABLE IV by a minimum rear tip rail X-wise extent, and wherein the Cartesian coordinate values of X, Y, and Z set forth in TABLE IV are joined smoothly with one another to define a front tip rail, downstream side surface profile.

17. The turbine blade tip shroud of claim 16, wherein the turbine blade includes a second stage blade.

18. The turbine blade tip shroud of claim 17, wherein the downstream side of the rear tip rail has a shape having a nominal profile in accordance with Cartesian coordinate values of X, Y, and Z set forth in TABLE I and originating at the first origin, wherein the Cartesian coordinate values X, Y, Z set forth in TABLE I are non-dimensional values of from 0% to 100% convertible to distances by multiplying the Cartesian coordinate values of X, Y, and Z set forth in TABLE I by the minimum rear tip rail X-wise extent expressed in units of distance, and wherein the Cartesian coordinate values of X, Y, and Z set forth in TABLE I are connected by lines to define a rear tip rail, first downstream side surface profile.

19. The turbine blade tip shroud of claim 18, wherein the rear tip rail further includes a third origin on the suction side of the airfoil and at a radial outermost point farthest from the suction side of the airfoil, and wherein the downstream side of the rear tip rail has a shape having a nominal profile in accordance with Cartesian coordinate values of X, Y, Z and thickness values set forth in TABLE II and originating at the third origin, wherein the Cartesian coordinate values X, Y, Z set forth in TABLE II are non-dimensional values of from 0% to 100% convertible to distances by multiplying the values by the minimum rear tip rail X-wise extent, and wherein the X and Y values set forth in TABLE II are joined smoothly to define a rear tip rail, second downstream side surface profile.

20. The turbine blade tip shroud of claim 19, wherein the upstream side of the rear tip rail has a shape having a nominal profile in accordance with Cartesian coordinate values of X, Y, and Z set forth in TABLE III and originating at the first origin, wherein the Cartesian coordinate values X, Y, and Z set forth in TABLE III are non-dimensional values of from 0% to 100% convertible to distances by multiplying the Cartesian coordinate values of X, Y, and Z set forth in TABLE III by the minimum rear tip rail X-wise extent expressed in units of distance, and wherein the Cartesian coordinate values of X, Y, and Z set forth in TABLE III are connected by lines to define a rear tip rail, upstream side surface profile.

* * * * *